US006530834B2

United States Patent
Kondo

(10) Patent No.: US 6,530,834 B2
(45) Date of Patent: Mar. 11, 2003

(54) TRAINING GAME DEVICE, CONTROL METHOD THEREOF, AND READABLE STORAGE MEDIUM FOR STORING TRAINING GAME PROGRAMS

(75) Inventor: Tetsuya Kondo, Nara (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/854,700

(22) Filed: May 14, 2001

(65) Prior Publication Data
US 2001/0041615 A1 Nov. 15, 2001

(30) Foreign Application Priority Data

May 15, 2000 (JP) ........................................ 2000-142226

(51) Int. Cl.[7] ................................................ A63F 13/00
(52) U.S. Cl. .................................. 463/4; 463/1; 463/36
(58) Field of Search ................................. 463/4–36, 44, 463/45; 434/167, 169, 185, 308

(56) References Cited

U.S. PATENT DOCUMENTS

| 4,372,556 | A | * | 2/1983 | Minkoff et al. ................ 273/85 |
| 5,885,156 | A | | 3/1999 | Toyohara et al. |
| 5,890,906 | A | * | 4/1999 | Macri et al. .................. 434/247 |
| 6,152,821 | A | * | 11/2000 | Nakagawa et al. ............. 463/4 |
| 6,155,924 | A | * | 12/2000 | Nakagawa et al. ............. 463/4 |
| 6,183,259 | B1 | * | 2/2001 | Macri et al. .................. 434/247 |
| 6,280,323 | B1 | * | 8/2001 | Yamazaki et al. .............. 463/4 |
| 6,347,993 | B1 | * | 2/2002 | Kondo et al. .................. 463/1 |
| 6,402,619 | B1 | * | 6/2002 | Sato ............................ 463/43 |

FOREIGN PATENT DOCUMENTS

| EP | 0962891 | 12/1999 |
| JP | 09-140938 | 6/1997 |
| JP | 11-076621 | 3/1999 |
| JP | 11-153948 | 6/1999 |
| JP | 11-342261 | 12/1999 |
| JP | 11-342263 | 12/1999 |

OTHER PUBLICATIONS

P. 35 and 283 of "Perfect Guide for '99 opening game of powerful professional baseball games in live the first edition" published by Konami Corporation on Aug. 21, 1999.
Trulsen O et al: "Championship Manager Season 97/98" Online!, Nov. 1997, pp. 1–10, XP002116024, * p. 2, paragraph 5, * p. 5, paragraph 1 *.

* cited by examiner

Primary Examiner—Gene Mancene
Assistant Examiner—Frederick C. Nicolas
(74) Attorney, Agent, or Firm—Jordan and Hamburg LLP

(57) ABSTRACT

It is an object of the present invention to enable a user to play a more interesting and amusing game. This video game system receives specification of a training type for the main game character by means of a controller 5 and increases or decreases the values of a plurality of parameters that characterize the main character in correspondence with the specified training type. In this video game system, different average values are set for respective countries from which a country of citizenship is selected for the main character, and the user specifies the country of citizenship of the main character at the start of the game. When a parameter value is to be increased or decreased, if the growth restraint control part 105 judges that the parameter value is greater than the average value, based on the average value holding table 230, which holds the average values and the parameter holding table 240, which holds the parameters for the main character, the increment correction part 106 suppresses increase in the parameter value by multiplying the parameter increment by a constant value a (0<a<1).

15 Claims, 32 Drawing Sheets

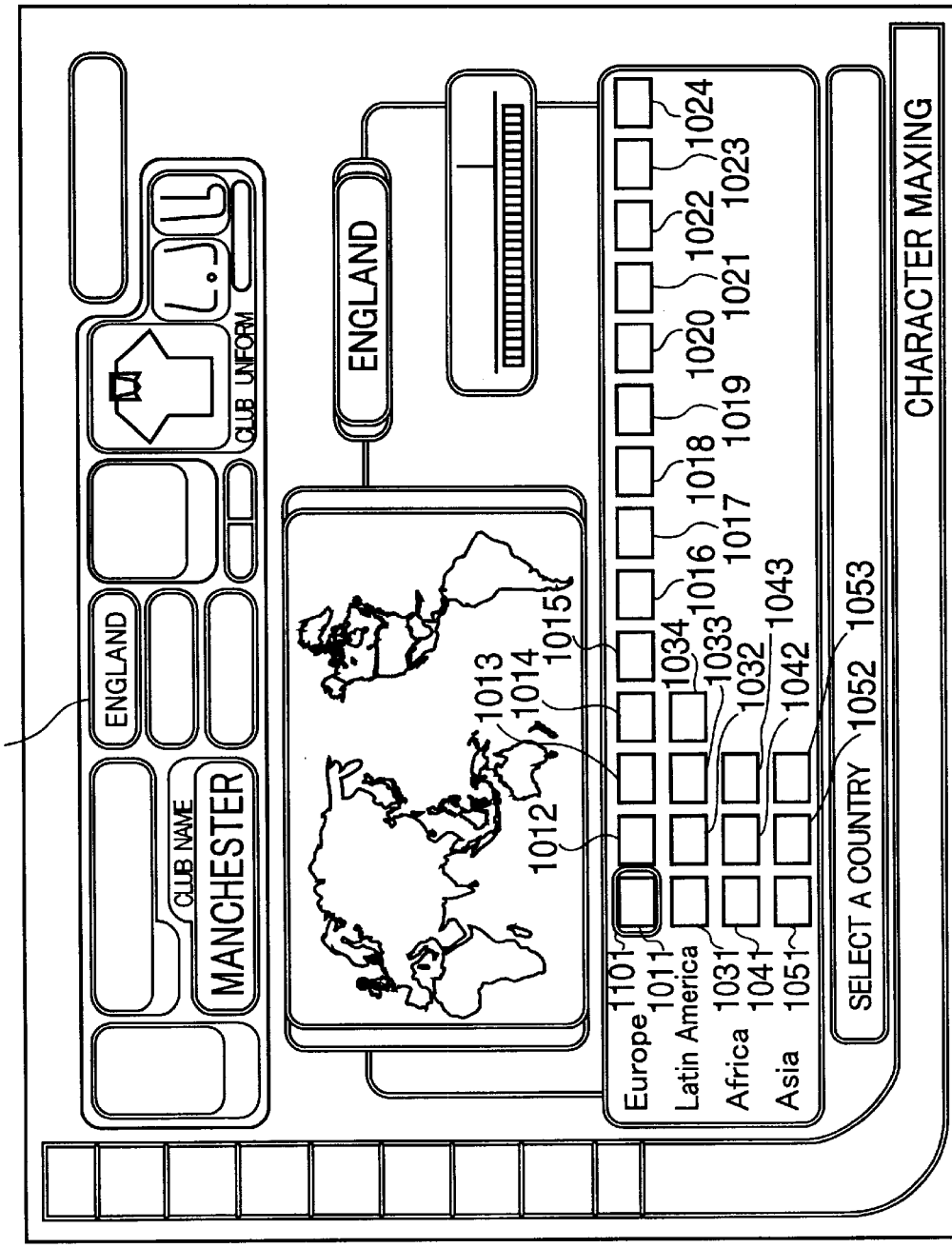

FIG.4A

| ITEM | DEFAULT VALUE |
|---|---|
| MORALE (EAGERNESS) | 2 |
| SPIRIT | RANDOM BETWEEN 100 AND 140 |
| PHYSICAL STRENGTH | 130 |
| JUDGEMENT | RANDOM BETWEEN 1200 AND 1300 |
| SHOOTING (GOAL KICKING) | |
| CURVING | |
| SPEED | |
| DASH | |
| STAMINA | |
| JUMPING | |
| BALL KEEPING | |
| DEFENCE | |
| PASSING | |
| ABILITY AS A GOAL KEEPER | |

FIG.4B

| ITEM | DEFAULT BASE VALUES | | | | |
|---|---|---|---|---|---|
| | GOAL KEEPER | CENTER BACK, DEFENDER | WING BACK, LIBERO | OFFENSIVE HALF, MIDFIELD, WING BACK | CENTER FORWARD, STRIKER, WING |
| STRATEGIC OFFENCE | 600 | 750 | 750 | 750 | 600 |
| STRATEGIC DEFENSE | 600 | 600 | 690 | 750 | 750 |

A RANDOM VALUE BETWEEN −90 AND +90 IS ADDED TO THE ABOVE DEFAULT BASE VALUES TO CREATE THE DEFAULT VALUE

FIG.5

| RACE | OBJECT ITEMS | ADDITION |
|---|---|---|
| WHITE | PASSING, DEFENCE, STAMINA | ADDS A RANDOM VALUE BETWEEN 0 AND 90 |
| | STRATEGIC OFFENCE, STRATEGIC DEFENCE | ADDS A RANDOM VALUE BETWEEN 0 AND 45 |
| BROWN | BALL KEEPING, SHOOTING | ADDS A RANDOM VALUE BETWEEN 0 AND 90 |
| BLACK | DASH, JUMPING, STAMINA | ADDS A RANDOM VALUE BETWEEN 0 AND 90 |
| | STRATEGIC OFFENCE, STRATEGIC DEFENCE | ADDS A RANDOM VALUE BETWEEN 0 AND 45 |
| YELLOW | SPEED, DEFENCE | ADDS A RANDOM VALUE BETWEEN 0 AND 90 |
| | STRATEGIC OFFENCE, STRATEGIC DEFENCE | ADDS A RANDOM VALUE BETWEEN 0 AND 70 |

FIG.10

PARAMETER INCREASE/DECREASE TABLE (GK)

| | PHYSICAL STRENGTH | JUDGEMENT | GOAL SHOOTING | CURVING | SPEED | DASH | STAMINA | JUMPING | BALL KEEPING | DEFENCE | PASSING | ABILITY AS A GOAL KEEPER | STRATEGIC OFFENCE | STRATEGIC DEFENCE | MANAGER CONFIDENCE LEVEL | COACH CONFIDENCE LEVEL | TEAM MATE CONFIDENCE LEVEL |
|---|---|---|---|---|---|---|---|---|---|---|---|---|---|---|---|---|---|
| CIRCUIT TRAINING | -30 | +0 | +0 | +0 | +0 | +0 | +60 | +10 | +0 | +0 | +0 | +0 | +10 | +10 | +1 | +1 | +0 |
| AGILITY | -40 | +0 | +0 | +0 | +30 | +30 | +0 | +0 | +0 | -30 | -30 | +0 | +0 | +10 | +1 | +0 | +0 |
| DRIBBLING | -30 | +0 | +0 | +0 | +30 | +0 | +0 | +0 | +60 | +0 | -30 | -30 | +0 | +10 | +0 | +0 | -1 |
| GOAL KEEPER TRAINING | -30 | +0 | +30 | +0 | +0 | +0 | -10 | +0 | +0 | -30 | +0 | +60 | +10 | +30 | +1 | +0 | -1 |
| DEFENCE | -20 | -30 | -30 | +60 | +0 | +0 | +0 | +0 | +0 | +80 | +0 | +0 | +0 | +60 | +0 | -1 | +0 |
| SET PLAYS | -20 | +10 | +0 | +0 | +0 | -30 | -10 | +60 | +0 | +0 | +0 | +0 | +30 | +60 | +0 | -1 | +0 |
| HIGH BALLS | -20 | +0 | +0 | +0 | +0 | +0 | -10 | +0 | +0 | +0 | +80 | +10 | +0 | +30 | +1 | +0 | +0 |
| MATCH FORMAT | -50 | +0 | +10 | +0 | +0 | +0 | +30 | +0 | +0 | +0 | +0 | +0 | +30 | +60 | +1 | +1 | +1 |

(ALL SHOWN IN INTERNAL VALUES)

FIG.11

PARAMETER INCREASE/DECREASE TABLE (DF)

| | PHYSICAL STRENGTH | JUDGEMENT | GOAL SHOOTING | CURVING | SPEED | DASH | STAMINA | JUMPING | BALL KEEPING | DEFENCE | PASSING | ABILITY AS A GOAL KEEPER | STRATEGIC OFFENCE | STRATEGIC DEFENCE | MANAGER CONFIDENCE LEVEL | COACH CONFIDENCE LEVEL | TEAM MATE CONFIDENCE LEVEL |
|---|---|---|---|---|---|---|---|---|---|---|---|---|---|---|---|---|---|
| CIRCUIT TRAINING | -30 | +0 | +0 | +0 | +0 | +0 | +60 | +10 | +0 | +0 | +0 | +0 | +10 | +10 | +1 | +1 | +0 |
| AGILITY | -40 | +0 | +0 | +0 | +30 | +30 | +0 | +0 | +0 | -30 | -30 | +0 | +0 | +30 | +0 | +0 | +0 |
| DRIBBLING | -30 | +0 | +0 | +0 | +30 | +0 | +0 | +0 | +60 | +0 | -30 | -30 | +10 | +10 | +0 | +0 | -1 |
| GOAL SHOOTING | -30 | +30 | +60 | +0 | +0 | +0 | -30 | +0 | +0 | -30 | +0 | +60 | +30 | +0 | +1 | -3 | -3 |
| DEFENCE | -20 | -30 | -30 | +0 | +0 | +0 | +10 | +0 | +0 | +80 | +0 | +0 | +0 | +60 | +0 | +0 | +0 |
| SET PLAYS | -20 | +10 | +0 | +60 | +0 | +0 | -10 | +0 | +0 | +30 | +0 | +0 | +30 | +60 | +1 | +0 | +0 |
| HEADING | -20 | +0 | +0 | +0 | +0 | -30 | -10 | +60 | +0 | +0 | +0 | +0 | +0 | +30 | +1 | +0 | +0 |
| MATCH FORMAT | -50 | +0 | +0 | +0 | +0 | +0 | +30 | +0 | +0 | +30 | +80 | +10 | +30 | +60 | +1 | +1 | +1 |

FIG.12

PARAMETER INCREASE/DECREASE TABLE (MF)

| | PHYSICAL STRENGTH | JUDGEMENT | GOAL SHOOTING | CURVING | SPEED | DASH | STAMINA | JUMPING | BALL KEEPING | DEFENCE | PASSING | ABILITY AS A GOAL KEEPER | STRATEGIC OFFENCE | STRATEGIC DEFENCE | MANAGER CONFIDENCE LEVEL | COACH CONFIDENCE LEVEL | TEAM MATE CONFIDENCE LEVEL |
|---|---|---|---|---|---|---|---|---|---|---|---|---|---|---|---|---|---|
| CIRCUIT TRAINING | -30 | +0 | +0 | +0 | +0 | +0 | +60 | +10 | +0 | +0 | +0 | +0 | +10 | +10 | +1 | +1 | +0 |
| AGILITY | -40 | +0 | +0 | +0 | +30 | +30 | +0 | +0 | +0 | -30 | -30 | +0 | +30 | +0 | +0 | +0 | +0 |
| DRIBBLING | -30 | +0 | +0 | +0 | +30 | +0 | +0 | +0 | +60 | +0 | -30 | -30 | +30 | +10 | +1 | +0 | -1 |
| GOAL SHOOTING | -30 | +30 | +60 | +0 | +0 | +0 | -30 | +0 | +0 | -30 | +0 | +60 | +60 | +0 | +0 | -1 | -3 |
| DEFENCE | -20 | -30 | -30 | +0 | +0 | +0 | +10 | +0 | +0 | +80 | +10 | +0 | +0 | +60 | +0 | +0 | +0 |
| SET PLAYS | -20 | +10 | +0 | +60 | +0 | -30 | -10 | +60 | +0 | +30 | +0 | +0 | +60 | +30 | +1 | +0 | +0 |
| HEADING | -20 | +10 | +0 | +0 | +0 | +0 | -10 | +0 | +0 | +0 | +0 | +10 | +60 | +30 | +0 | +0 | +0 |
| MATCH FORMAT | -50 | +0 | +0 | +0 | +0 | +0 | +30 | +0 | +0 | +10 | +80 | +10 | +30 | +30 | +1 | +1 | +1 |

FIG.13

PARAMETER INCREASE/DECREASE TABLE (FW)

| | PHYSICAL STRENGTH | JUDGEMENT | GOAL SHOOTING | CURVING | SPEED | DASH | STAMINA | JUMPING | BALL KEEPING | DEFENCE | PASSING | ABILITY AS A GOAL KEEPER | STRATEGIC OFFENCE | STRATEGIC DEFENCE | MANAGER CONFIDENCE LEVEL | COACH CONFIDENCE LEVEL | TEAM MATE CONFIDENCE LEVEL |
|---|---|---|---|---|---|---|---|---|---|---|---|---|---|---|---|---|---|
| CIRCUIT TRAINING | -30 | +0 | +0 | +0 | +0 | +0 | +60 | +10 | +0 | +0 | +0 | +0 | +10 | +10 | +1 | +1 | +0 |
| AGILITY | -40 | +0 | +0 | +0 | +30 | +30 | +0 | +0 | +0 | -30 | -30 | -30 | +30 | +0 | +0 | +1 | +0 |
| DRIBBLING | -30 | +0 | +0 | +0 | +30 | +0 | +0 | +0 | +60 | +0 | -30 | +60 | +30 | +10 | +1 | +0 | -1 |
| GOAL SHOOTING | -30 | +30 | +60 | +0 | +0 | +0 | -30 | +0 | +0 | -30 | +0 | +0 | +60 | +0 | +0 | +0 | -3 |
| DEFENCE | -20 | -30 | -30 | +0 | +0 | +0 | +10 | +0 | +0 | +80 | +0 | +0 | +0 | +10 | +0 | -3 | +0 |
| SET PLAYS | -20 | +10 | +0 | +60 | +0 | +0 | -10 | +0 | +0 | +0 | +0 | +0 | +30 | +10 | +1 | +0 | +0 |
| HEADING | -20 | +10 | +0 | +0 | +0 | -30 | -10 | +60 | +0 | +0 | +0 | +0 | +60 | +10 | +0 | +0 | +0 |
| MATCH FORMAT | -50 | +10 | +10 | +0 | +0 | +0 | +30 | +0 | +0 | +0 | +80 | +10 | +30 | +10 | +1 | +1 | +1 |

FIG.14

PROMOTION STATE PROBABILITY TABLE

| TEAM MATE CONFIDENCE LEVEL | PROBABILITY OF PROMOTION STATE OCCURRENCE |
|---|---|
| 0~39 | 0% |
| 40~79 | 0% |
| 80~99 | 1% |
| 100~149 | 5% |
| 150~199 | 10% |
| 200~229 | 15% |
| 230~255 | 20% |

FIG.16

AVERAGE VALUE HOLDING TABLE

| COUNTRY NAME | AVERAGE VALUE (CORRESPONDING INTERNAL PARAMETER VALUE) |
|---|---|
| ENGLAND, FRANCE, GERMANY, ITALY, BRAZIL, ARGENTINA | 80 (3031~3100) |
| SPAIN, HOLLAND, SWEDEN, NORWAY, PORTUGAL, DENMARK, CZECH, MEXICO, NIGERIA | 75 (2681~2750) |
| TURKEY, BELGIUM, GREECE, CAMEROON, SOUTH AFRICA | 70 (2351~2400) |
| USA, JAPAN, KOREA, CHINA | 65 (2101~2150) |

FIG.17

PARAMETER CONVERSION TABLE

| INTERNAL PARAMETERS | INTERNAL PARAMETERS REQUIRED TO INCREASE OR DECREASE DISPLAY | DISPLAY PARAMETERS |
|---|---|---|
| 0 ~ 1500 | 30 | 0 ~ 50 |
| 1501 ~ 1900 | 40 | 51 ~ 60 |
| 1901 ~ 2400 | 50 | 61 ~ 70 |
| 2401 ~ 3100 | 70 | 71 ~ 80 |
| 3101 ~ 3900 | 80 | 81 ~ 90 |
| 3901 ~ 4800 | 90 | 91 ~ 99 |

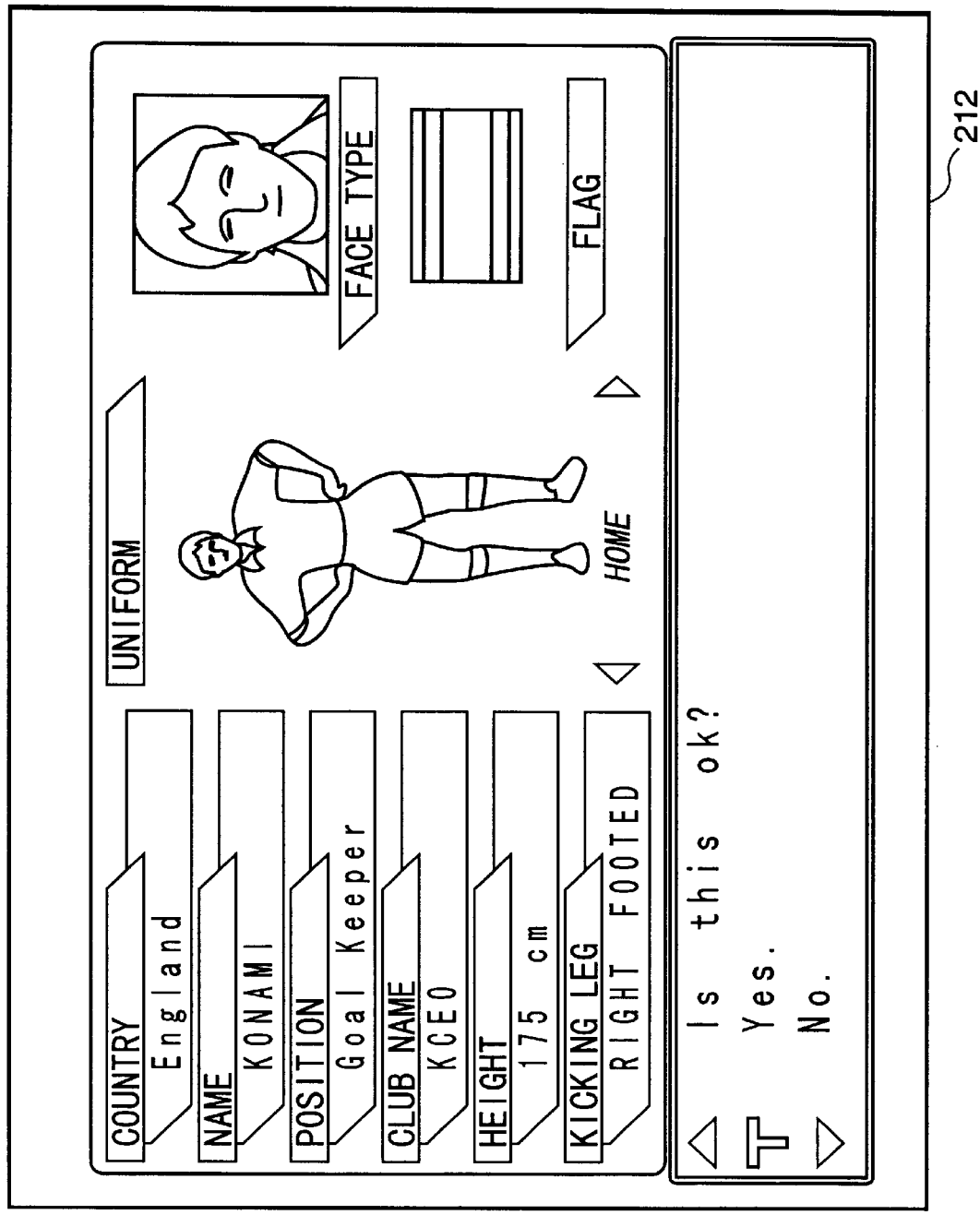

FIG.22A

| ITEM | DEFAULT VALUES | NOTES |
|---|---|---|
| PHYSICAL CONDITION | INTERNAL VALUE FIXED AT 130 | |
| MORALE (EAGERNESS) | INTERNAL VALUE FIXED AT 2 | |
| SPIRIT | INTERNAL VALUE BETWEEN 100 AND 139 | |
| NORMAL PARAMETERS | INTERNAL VALUE BETWEEN 108 AND 128 | JUDGEMENT, GOAL, SHOOTING, CURVING, SPEED, DASH |
| IMPORTANT PARAMETERS | INTERNAL VALUE BETWEEN 120 AND 134 | STAMINA, JUMPING, BALL KEEPING, DEFENCE |

FIG.22B

| RACE | OBJECT ITEMS | OBJECT ITEMS |
|---|---|---|
| WHITE | PASSING, DEFENCE, STAMINA | ADDS A (RANDOM) VALUE BETWEEN 0 % AND 5 % TO EACH ITEM |
| BROWN | BALL KEEPING, GOAL SHOOTING | |
| BLACK | DASH, JUMPING, STAMINA | |
| YELLOW | SPEED | |

FIG.23A

WHEN 'PLAY MATCH' IS SELECTED

| RESULTS | ADDED VALUES (INTERNAL VALUES) |
|---|---|
| WIN | 15 |
| WIN IN PK | 12 |
| DRAW | 10 |
| LOSS IN PK | 5 |
| LOSS | 2 |
| WITHDRAWALS AFTER RECEIVING A CARD | 0 |

FIG.23B

WHEN 'VIEW RESULTS' IS SELECTED

| RESULTS | ADDED VALUES (INTERNAL VALUES) |
|---|---|
| WIN WITH A FOUR POINT OR HIGHER MARGIN | 12 |
| WIN WITH A THREE POINT MARGIN | 10 |
| WIN WITH A TWO POINT MARGIN | 8 |
| WIN WITH A ONE POINT MARGIN | 6 |
| DRAW | 5 |
| LOSS WITH A ONE POINT MARGIN | 3 |
| LOSS WITH A TWO POINT MARGIN | 1 |
| LOSS WITH A THREE POINT OR HIGHER MARGIN | 0 |

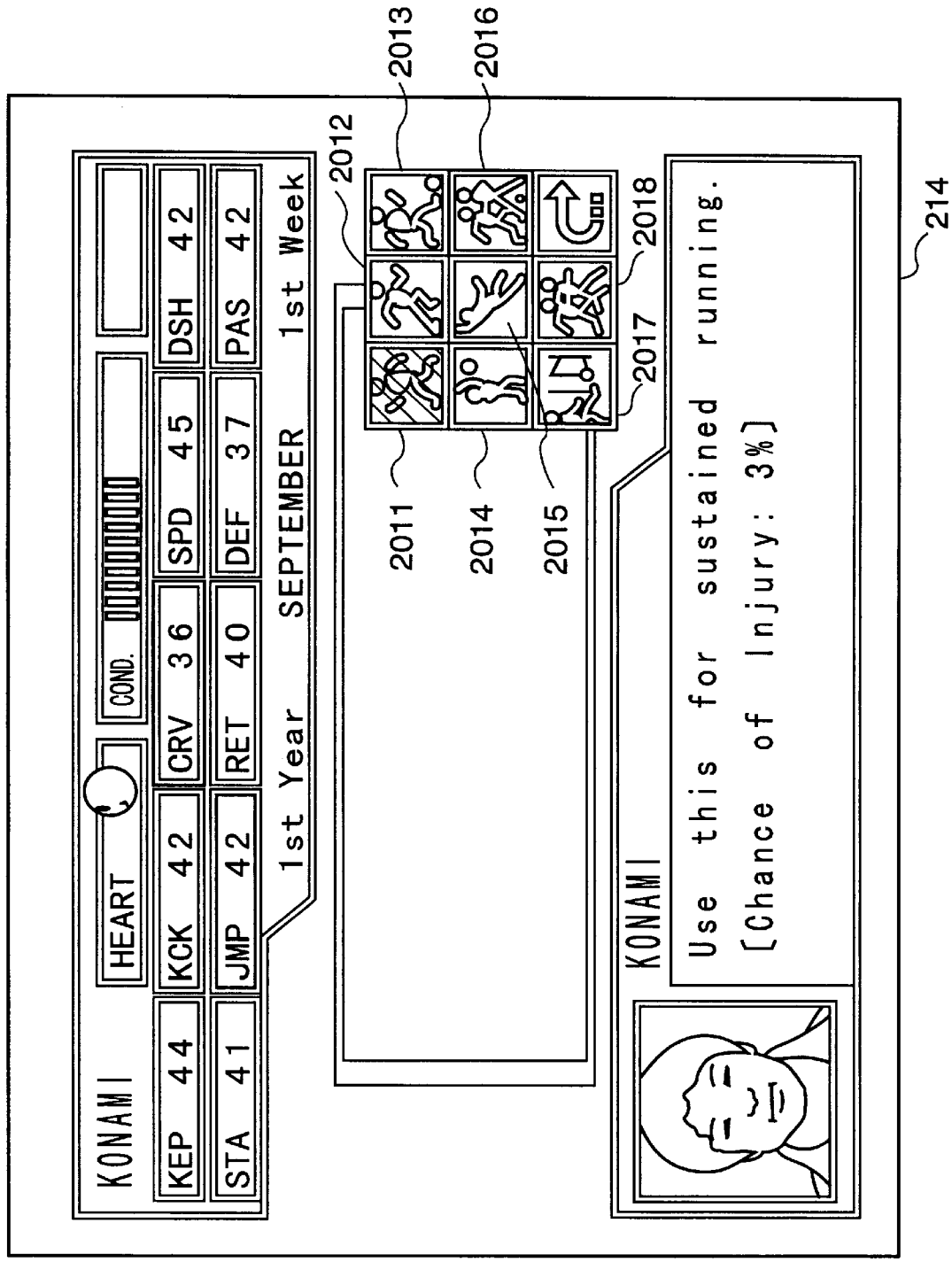

FIG.26

PARAMETER INCREASE/DECREASE TABLE

| TRAINING TYPE | JUDGEMENT | GOAL SHOOTING | CURVING | SPEED | DASH | STAMINA | JUMPING | BALL KEEPING | DEFENCE | PASSING |
|---|---|---|---|---|---|---|---|---|---|---|
| RUNNING | | | | | | 6 | 1 | | | |
| DASH(AGILITY) | | | | 4 | 4 | | | -4 | | -4 |
| DRIBBLING | | | | 4 | | | | 5 | | -4 |
| GOAL SHOOTING | 4 | 4 | | | | -4 | | | -6 | |
| DEFENCE | -4 | -4 | | | | | | | 8 | |
| PLACE AND KICK | 1 | 1 | 6 | | -4 | -4 | | | | |
| HEADING(HIGH BALLS) | | | | | | | 6 | | | |
| BALL KEEPING | | 3 | | | | | | | | -3 |
| MATCH FORMAT (FW) | | 1 | | | | 3 | | | | 8 |
| MATCH FORMAT (MF) | | | | | | 3 | | 2 | | 8 |
| MATCH FORMAT (DF) | | | | | | 3 | | | 2 | 8 |
| MATCH FORMAT (GK) | 1 | | | | | 3 | | | | 8 |

(WHEN THE MAIN CHARACTER IS A GOAL KEEPER, DASH IS CHANGED TO AGILITY AND JUDGEMENT TO ABILITY AS A GOAL KEEPER)

FIG.27

PROMOTION STATE PROBABILITY TABLE

| TEAM MATE CONGFIDENCE LEVEL | PROMOTION STATE OCCURRENCE PROBABILITY |
|---|---|
| 0~79 | 0% |
| 80~99 | 1% |
| 100~149 | 5% |
| 150~199 | 10% |
| 200~229 | 15% |
| 230~255 | 20% |

FIG.29

AVERAGE VALUE HOLDING TABLE

| COUNTRY NAME | AVERAGE VALUE (CORRESPONDING INTERNAL PARAMETER VALUE) |
|---|---|
| ENGLAND, FRANCE, GERMANY, ITALY, BRAZIL, ARGENTINA | 80 (304~310) |
| SPAIN, HOLLAND, SWEDEN, NORWAY, PORTUGAL, DENMARK, CZECH, MEXICO, NIGERIA | 75 (269~275) |
| TURKEY, BELGIUM, GREECE, CAMEROON, SOUTH AFRICA | 70 (236~240) |
| USA, JAPAN, KOREA, CHINA | 65 (211~215) |

FIG.30

PARAMETER CONVERSION TABLE

| INTERNAL PARAMETERS | INTERNAL PARAMETERS REQUIRED TO INCREASE OR DECREASE DISPLAY PARAMETER BY 1 | DISPLAY PARAMETERS |
|---|---|---|
| 0 ~ 150 | 3 | 0 ~ 50 |
| 151 ~ 190 | 4 | 51 ~ 60 |
| 191 ~ 240 | 5 | 61 ~ 70 |
| 241 ~ 310 | 7 | 71 ~ 80 |
| 311 ~ 390 | 8 | 81 ~ 90 |
| 391 ~ 480 | 9 | 91 ~ 99 |

TRAINING GAME DEVICE, CONTROL METHOD THEREOF, AND READABLE STORAGE MEDIUM FOR STORING TRAINING GAME PROGRAMS

BACKGROUND OF THE INVENTION

1. Field of the Invention

The present invention relates to technology for a training game device for training game characters by increasing or decreasing values of a plurality of parameters that characterize the game character.

2. Description of the Related Art

There have been video games which are designed such that a user (or an operator of a game device, here and hereinafter) can simulate experience of a sport, such as soccer or the like, using a game character, and achieve the goal set in the game by inputting operations.

A variety of such video games are known. Common in the marketplace are those (programs and storage media for storing data for) video games in which a plurality of parameters that characterize abilities and the like are set for a game character, and the target of which is to reach a predetermined value for each of these parameters. (These programs on storage media can be executed by home game devices and PCs, and the video games are played by users.)

More specifically, in such video games, a user is given a predetermined number of opportunities to enter operations. The user selects from a predetermined alternatives and enters this selection. In response to the selection, a plurality of parameters are increased or decreased in accordance with rules hidden from the user. When the predetermined number of opportunities for entering operations has been reached, some of the plurality of parameters (soccer positions and so on) that suit the role of the game character are used selectively, and it is determined whether or not these parameters are greater than the predetermined reference values (that is, it is determined whether or not, of the parameters that characterize the game character, those that are required for a specific position have reached the specified reference value). The goal of the game is deemed to be have been reached when the selected parameters are greater than the reference value, and the predetermined video and music that indicate that the goal has been reached are regenerated.

However, in conventional video games as described above (even if probable fluctuations can be added to the increase or decrease in the parameters), basically the value of parameters are simply increased or decreased in accordance with user selections. The parameters of the game character after being trained using the increase or decrease in the parameters, are not individualized to correspond to any particular category. Therefore, these video games do not really offer enough amusement or fun to fully satisfy viewers.

SUMMARY OF THE INVENTION

With the foregoing in view, it is an object of the present invention to provide a training game device, a control method therefor and a readable storage medium for storing the training game program, that enable users to play a game which is more amusing and exciting.

For achieving this object, a training game device according to the present invention receives specification of one of a plurality of predetermined training types through a prescribed input part for a game character displayed on a monitor, and enables the game character to be trained by increasing or decreasing values of a plurality of parameters that characterize the game character in correspondence with the specified training type.

In this training game device, a game character is assigned, as his country of citizenship, to one of a plurality of countries that are specified in advance. When the value of parameter is increased or decreased, a judgment is made as to whether or not the parameter value is greater than the reference value predetermined for the specified country. If it is determined that the parameter value is greater than the above reference value, increase in the parameter value is suppressed.

In the above training game device, a probability is set according to the value of one predetermined parameter that characterizes a game character. Increase of the parameter value is promoted in accordance with the set probability, and the above suppression occurs only when the above promotion is not performed.

These and other objects, features and advantages of the present invention will become more apparent upon reading of the following detailed description along with the accompanied drawings.

BRIEF DESCRIPTION OF THE DRAWINGS

FIG. 3 shows the screen 201 displayed in the character making in ST5 of FIG. 2;

FIG. 4 shows the default values set for items corresponding to the abilities of the main character in the character making;

FIG. 5 shows the values added to the default values for parameters shown in FIG. 4 in accordance with the race of the main character;

FIG. 10 shows the parameter increase/decrease table (GK) used for setting increments for internal parameters (internal parameter value) in ST1402 in FIG. 8;

FIG. 11 shows the parameter increase/decrease table (DF) for parameters used for setting increments for internal parameters in ST1402 in FIG. 8;

FIG. 12 shows the parameter increase/decrease table (MF) used for setting increments for internal parameters in ST1402 in FIG. 8;

FIG. 13 shows the parameter increase/decrease table (FW) used for setting increments for internal parameters in ST1402 in FIG. 8;

FIG. 14 shows the promotion (bonus) state probability table used when occurrence or non-occurrence of a promotion state is determined in ST1403 in FIG. 8;

FIG. 15 shows the screen 204 that includes the display of degrees of confidence of the club manager, representative team manager, team mates and so on;

FIG. 16 shows the average value holding table used when exercise or non-exercise of growth restraint is determined in ST1406 in FIG. 8;

FIG. 17 shows the parameter conversion table used when converting the internal values of parameters into display values in ST1410 in FIG. 8.

FIG. 21 shows the screen 212 displayed in association with the character making;

FIG. 22 shows the default values set for items corresponding to the abilities of the main character by the character making;

FIG. 23 shows the added values for parameters in accordance with a result of the selected game(corresponding to processing in ST6 of FIG. 2);

FIG. 25 shows the screen 214 displayed when selecting training types (corresponding to processing in ST1401 of FIG. 8);

FIG. 26 shows the parameter increase/decrease table used for setting the increments and decrements for internal parameters (corresponding to processing in ST1402 in FIG. 8);

FIG. 27 shows the promotion probability table used when determining occurrence or non-occurrence of a promotion state (to correspond to processing in ST1403);

FIG. 29 shows the average value holding table used when determining exercise or non-exercise of growth restraint (corresponding to processing in ST1406);

FIG. 30 shows the parameter conversion table used for converting internal parameter values to display values (corresponding to processing in ST1410);

DETAILED DESCRIPTION OF THE EMBODIMENTS

The video game system included in embodiments of the present invention will be explained using the diagrams for reference.

Figure 1:
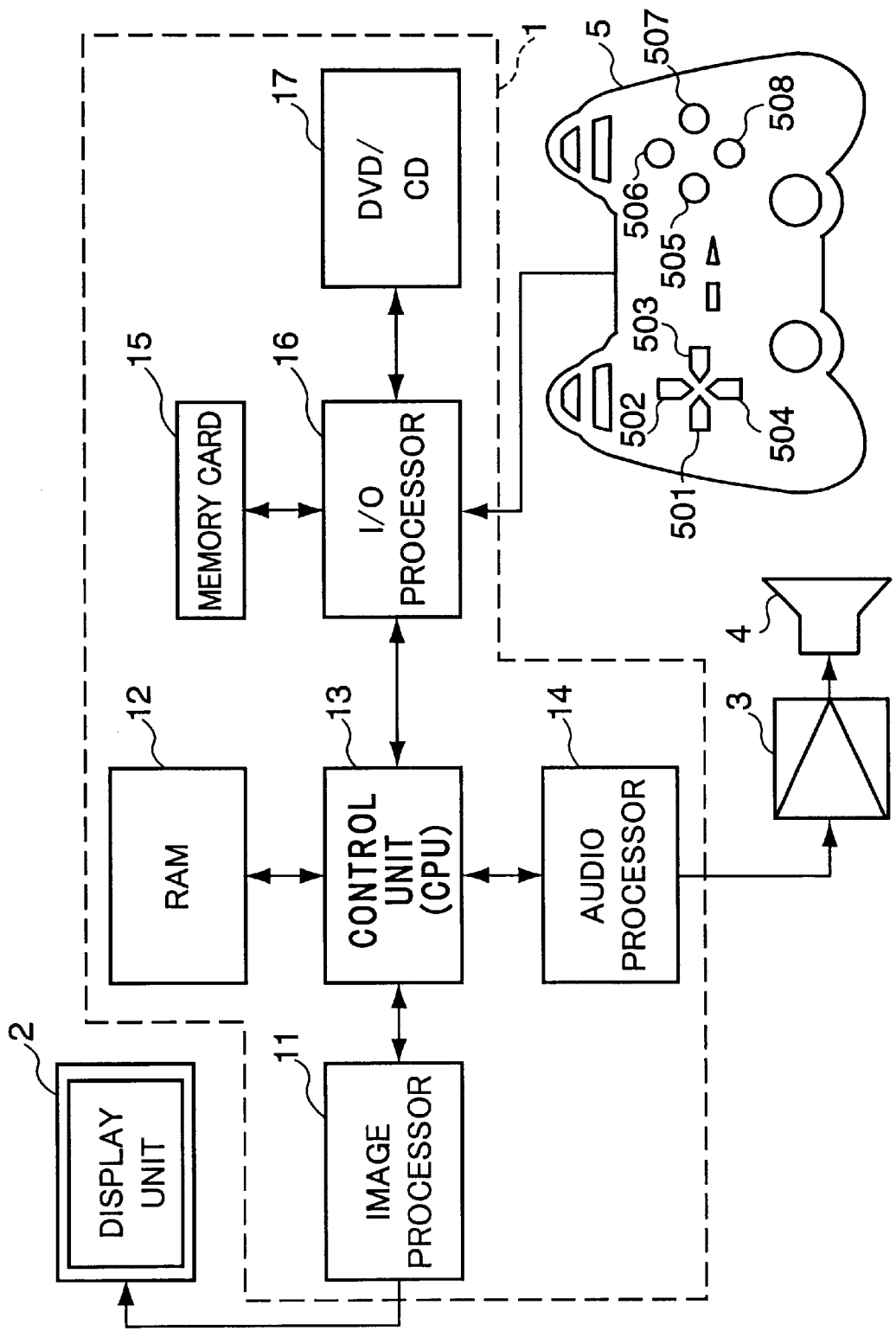
FIG. 1 shows the overall configuration of the video game system of a first embodiment of the present invention.

FIG. 1 shows the overall configuration of the video game device that is a first embodiment of the present invention.

This video game system comprises: a game device main unit 1 that implements the main controls so that a user can play the game; a display device 2 such as a CRT (hereinafter referred to as a display unit) that displays video based on video signals from the game device main unit 1; an AV amp 3 and speakers 4 for regenerating audio data(including music here and hereinafter) based on audio signals from the game device main unit 1; and a controller 5 that the user uses to enter operations into the game device main unit 1.

More specifically, the game device main unit 1 comprises: a DVD-ROM/CD-ROM drive 17 for reading programs, image data, and audio data from a DVD-ROM or CD-ROM for the specified game; RAM 12 for temporary storage of programs read from the DVD-ROM (or CD-ROM here and hereinafter) and data used in the programs; a control unit (CPU) 13 for controlling the overall progress of the game based on the program in the RAM 12; a memory card 15 for holding data generated during a game (even after the power to the game device main unit 1 has been interrupted); an input/output (I/O) processing part 16 for processing inputs from the controller 5, for reading data from the DVD-ROM/CD-ROM drive 17, and for reading data from and writing data to the memory card 15; an image processor 11 for generating video signals from image data read from the DVD-ROM while implementing specific image processing such as polygon drawing; and an audio processor 14 having an ADPCM audio source and generating audio signals from audio data read from the DVD-ROM. Also, the controller 5, which is connected to the I/O processor 16, comprises left-hand buttons 501 through 504 for prompting cursor movements that are displayed on the screen of the display unit 2 and right-hand buttons 505 through 508 for instructing whether commands selected by the cursor are to be selected or not.

In video game systems configured in this way, the user selectively presses buttons 501 through 508 on the controller 5 to enter what is required in response to the display on the screen on the display unit 2, and the game progresses with video and audio data being regenerated in accordance with the contents of the DVD-ROM inserted into the DVD-ROM/CD-ROM drive 17.

Figure 2:
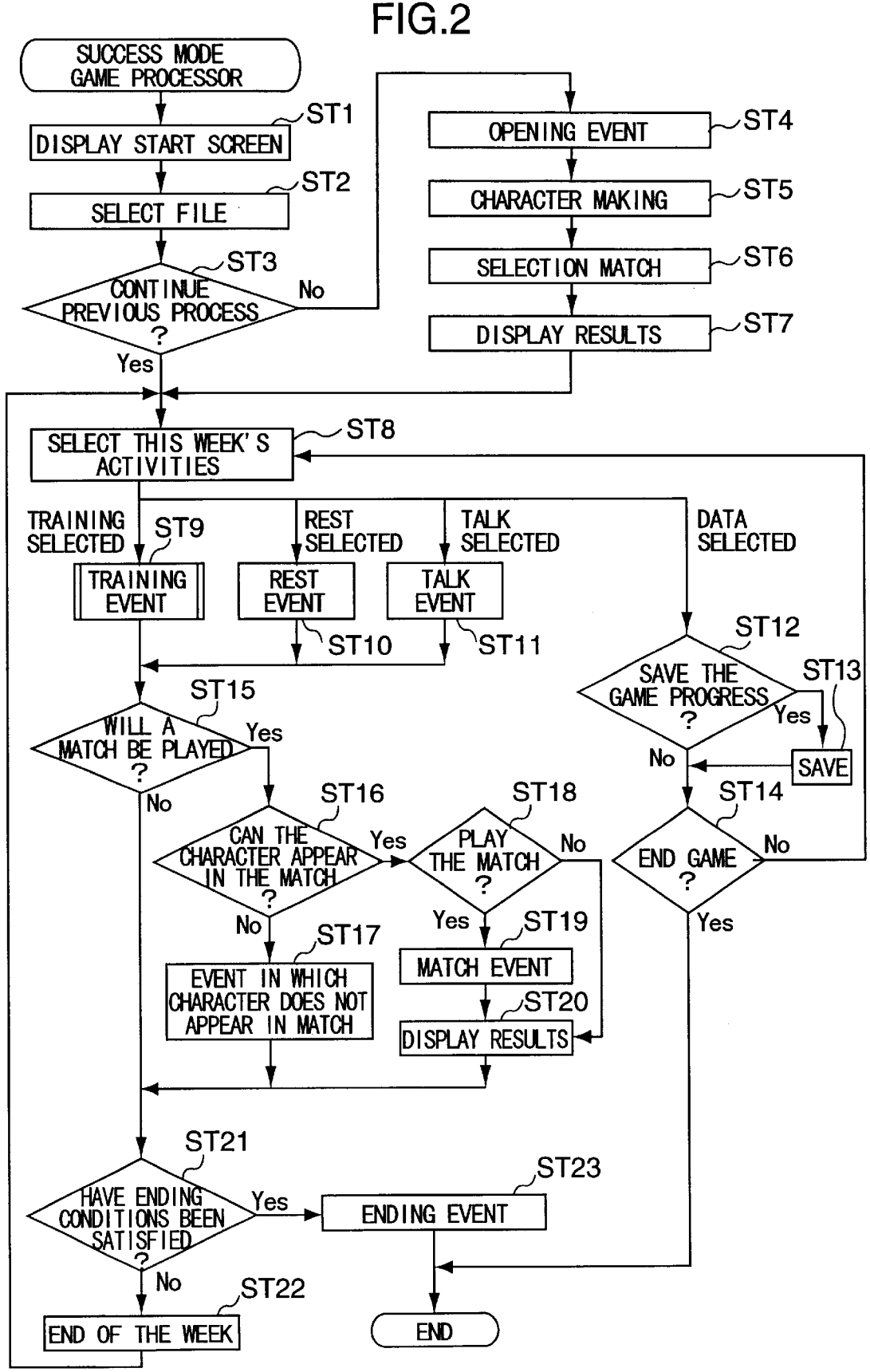
FIG. 2 is a flowchart that outlines the success mode game processing in this video game system.

In this video game system, success mode game processing (for success mode games that aim to improve the parameters that characterize the main character to a predetermined level by selective prompting of training for the main character in a certain number of input operations) is performed based on control that follows a flowchart such as that shown in FIG. 2. In particular, this video game system is characterized by the ST14 training event processing in the flowchart of FIG. 2.

Figure 6:
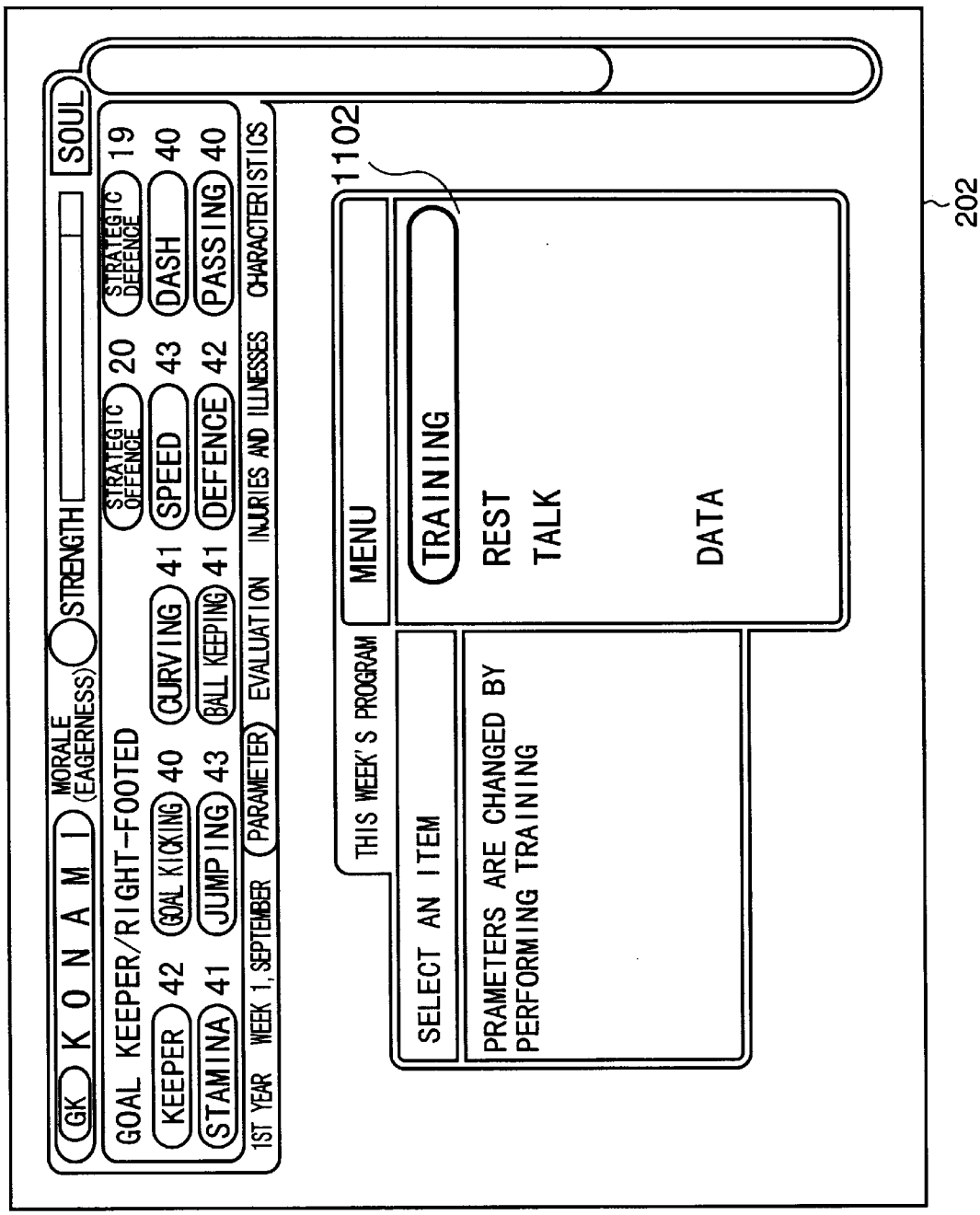
FIG. 6 is a diagram that shows the screen 202 displayed when this week's activity is selected in ST8 in FIG. 2.

FIG. 2 is a flowchart that provides an outline of success mode game processing in this video game system. FIG. 3 shows the screen 201 displayed in association with character making selected in ST5 in FIG. 2. FIG. 4 shows the default values set by character making for items that correspond to the abilities of the main character. Furthermore, FIG. 5 shows the values added to the default values of parameters shown in FIG. 4 in accordance with the race of the main character selected. FIG. 6 shows the screen 202 displayed when "this week's activities" is selected in ST8 in FIG. 2. (In this game, the main prompts to the main character are entered as this week's activity, that is an activity to be done each week in the game.)

In this success mode game processing, firstly the start screen that appears at the start of the success mode game is displayed (ST1) and a file corresponding to the main character in the memory card 15 (refer to FIG. 1) is selected by the user (ST2). (Here, it is assumed that files corresponding to a plurality of main characters are stored in the memory card 15, and that data specifying the progress of the game and data holding the values of a plurality of parameters that characterize the main character is stored in each file.)

It is determined whether or not a previously created main character has been selected or not (ST3). If a previously created main character is not selected (No in ST3), processing proceeds to ST8 after creating a new main character in the processing involved in ST4 through ST7. If a previously created main character is selected (Yes in ST3), processing proceeds directly to ST8 without the implementation of any of the processing involved in ST4 through ST7.

In ST4, predetermined video and audio data is regenerated as the opening event and character making for a new main character is implemented (ST5).

As shown in FIG. 3, in this character making, a country of citizenship of the main character is selected on the screen 201 that is displayed in display unit 2. In practice, the national flags of European countries England, France, Germany, Spain, Italy, Holland, Sweden, Turkey, Norway, Belgium, Portugal, Denmark, Greece, and Czech are displayed as national flags 1011 through 1024 on screen 201. The national flags of the American countries USA, Mexico, Brazil, and Argentina are displayed as national flags 1031 through 1034, national flags of the African countries Nigeria, Cameroon, and South Africa are displayed as national flags 1041 through 1043, and the national flags of the Asian countries, Japan, Korea, and China are shown as national flags 1051 through 1053.

The user uses the controller 5 (FIG. 1) to move the cursor 1101 up or down or to the right or left, so that the names of nations 1001 change as the cursor 1101 moves and the user selects a country of citizenship for the main character from these 24 countries.

In addition, a position played in soccer and a race of the main character can be set in the character making process. A soccer position can be selected from among goalkeeper, center back, defender, wing back, libero, offensive half, midfielder, wing back, center forward, striker, and wing, and a race can be selected based on skin colors from among white, brown, black, and yellow.

After this part of character making, default parameters (as internal values), as shown in FIG. 4A, that correspond to respective abilities that characterize the main character, that is morale (eagerness), spirit, physical strength, judgement, shooting (goal kicking), curving, speed, dash, stamina, jumping, ball keeping, defence, passing, and ability as a goal keeper, are inserted. Then, in accordance with the position selected by the user, the default values shown in FIG. 4B are inserted for the parameters corresponding to strategic offence (this refers to the level of understanding of offensive strategies and may be referred to as strategy OF) and strategic defence (this refers to the level of understanding of defensive strategies and may be referred to as strategy DF).

Furthermore, as shown in FIG. 5, random values are added to the parameters for a plurality of items in accordance with the selected race, and then character making ends.

Then, a selection match is performed (ST6 in FIG. 2) and the results of the match are displayed (ST7). This selection match is modelled on actual trials for entering an actual soccer club and is played when the user starts the game. Points equating to between 0% and 10% are then added to each parameter in accordance with the results of this match and the initial parameter display values based on internal values (the correlation between internal values and display valued are shown later in FIG. 14) are determined. (More specifically, the selection match shall be performed according to the processing in ST17 through ST19 explained below.)

When this processing finishes, the processing in ST8 through ST20 is repeated until the game ends in ST21 and ST23. In particular, the values of the parameters set for the main character vary according to the processing in ST9 through ST11 and the processing in ST19 allows these parameters (which change according to selections entered by the user) to be used for the soccer match. (The results of the match also change the parameter values.)

This week's activity is selected in ST8.

In the selection of this week's activity, a screen 202 is displayed on the display unit 2 as shown in FIG. 6. In practice, 'Training', 'Rest', 'Talk', and 'Data' are displayed as buttons on screen 202. The user uses the controller 5 (FIG. 1) to select one of these buttons by moving the cursor 1102 up or down. (The selection of this week's activity is restricted to a predetermined number of time, for example to about 110 times, which is equivalent in game hours to approximately 2 years.)

When 'Training' is selected in screen 202, (details will be explained later using FIGS. 7 through 19), the training event is performed (ST9). When 'Rest' or 'Talk" is selected, the rest event or 'talk event' is performed correspondingly (ST10, ST11). Here, the rest event increases the values of those of the main character's parameters that show physical strength and morale. Parameters that show levels of confidence and good impression may be set apart from the above parameters for the main character, so that the talk event increases the values of parameters that show the levels of confidence and good impression of the club manager and team mates.

Also, when 'Data' is selected on screen 202, it is determined whether or not an input for saving the game progress has been performed (ST12). If input to save the game progress has been performed (Yes in ST12), the game progress is saved in ST13 by saving all parameters for the main character and data that specifies the game progress onto the memory card 15 (FIG. 1), and successively it is determined whether or not an input has been made to end the game (ST14). If an input to save the game progress has not been made (No in ST12), such determination is performed without saving the game progress.

If an input to end the game is made (Yes in ST14), processing of this success mode game ends. If an input to end the game is not made (No in ST14), processing is repeated from ST8.

After the processing of ST9 through ST11, it is determined whether or not the timing of the match event has occurred (this timing is preset by specifying the number of times of ST8 processing) (ST15). If the timing for the match event has not occurred (No in ST15), processing will proceed to ST21. If the timing for the match event has occurred (Yes in ST15), processing of ST16 through ST20 will occur, then processing will proceed to ST21.

In ST16, it is determined whether or not the main character will be able to appear in the match in accordance with whether or not parameters such as the club manager's confidence, strategic offence, and strategic defence have reached the predetermined levels. If the main character cannot appear in the match (No in ST16), predetermined video and audio data will be regenerated as a 'match appearance denied event' (ST17) and processing will proceed to ST21. If the main character can appear in the match (Yes in ST16), a predetermined display will be provided and the user will be asked to select either 'play a match' or 'see the result', so that it is determined whether or not a match is played (ST18).

If 'play a match' is selected, soccer actions of the main character will be controlled by the parameters at the time of the match. As the player, of the 11 players (game characters in the game screen) including the main character, nearest the ball is operated by the user, an action game that models a real game of soccer is played by the use of polygon drawing (ST19). The win or loss result of this match is displayed (ST20), and predetermined values are added to parameters in accordance with the win-loss result of the match and the user's operation of the main character. If 'see the result' is selected, without an action game actually played, parameters such as morale, level of confidence of team mates, and so on are considered to determine the outcome of the game, and the win or loss result of this match is displayed (ST20). Predetermined values are then added to the parameter values in accordance with the win or loss result of the match.

In ST21, it is determined whether or not ending conditions have been satisfied based on the number of times for which ST8 processing has been carried out. If the ending conditions have not been satisfied (No in ST21), predetermined video and audio data for showing the end of a week is regenerated (ST22) and processing returns to ST8. If the ending conditions have been satisfied (Yes in ST21), video and audio data that corresponds to the parameters of the main character is selectively regenerated as the ending event (ST23) and processing of this success mode game ends.

Below, the processing involved in the training event of ST14 in the above success mode game will be explained using FIGS. 7 through 19. In particular, 'growth restraint' and 'promotion (bonus) state' occur in this training event processing, and these particularly relate to the present invention.

This 'growth restraint' refers to a "status in which values added to the parameter values through training and matches become less than usual values when the values of parameters for the main character exceed the average values preset for the main character's country of citizenship (explained later using FIG. 16)". When this 'growth restraint' is adopted in the game, if the user selects a country with low average values as the country of citizenship of the main character, it is difficult to nurture a player of outstanding ability but easier for the user to achieve the goal of the game.

'Promotion (bonus) state' is opposite, in nature, from 'growth restraint state'. It refers to "a status in which probabilities (explained later using FIG. 14) are set for the values that predetermined parameters for the main character, such as confidence of team mates and the like, can take, and the values added to the parameters are made greater than usual in accordance with these probabilities'.

Figure 7:
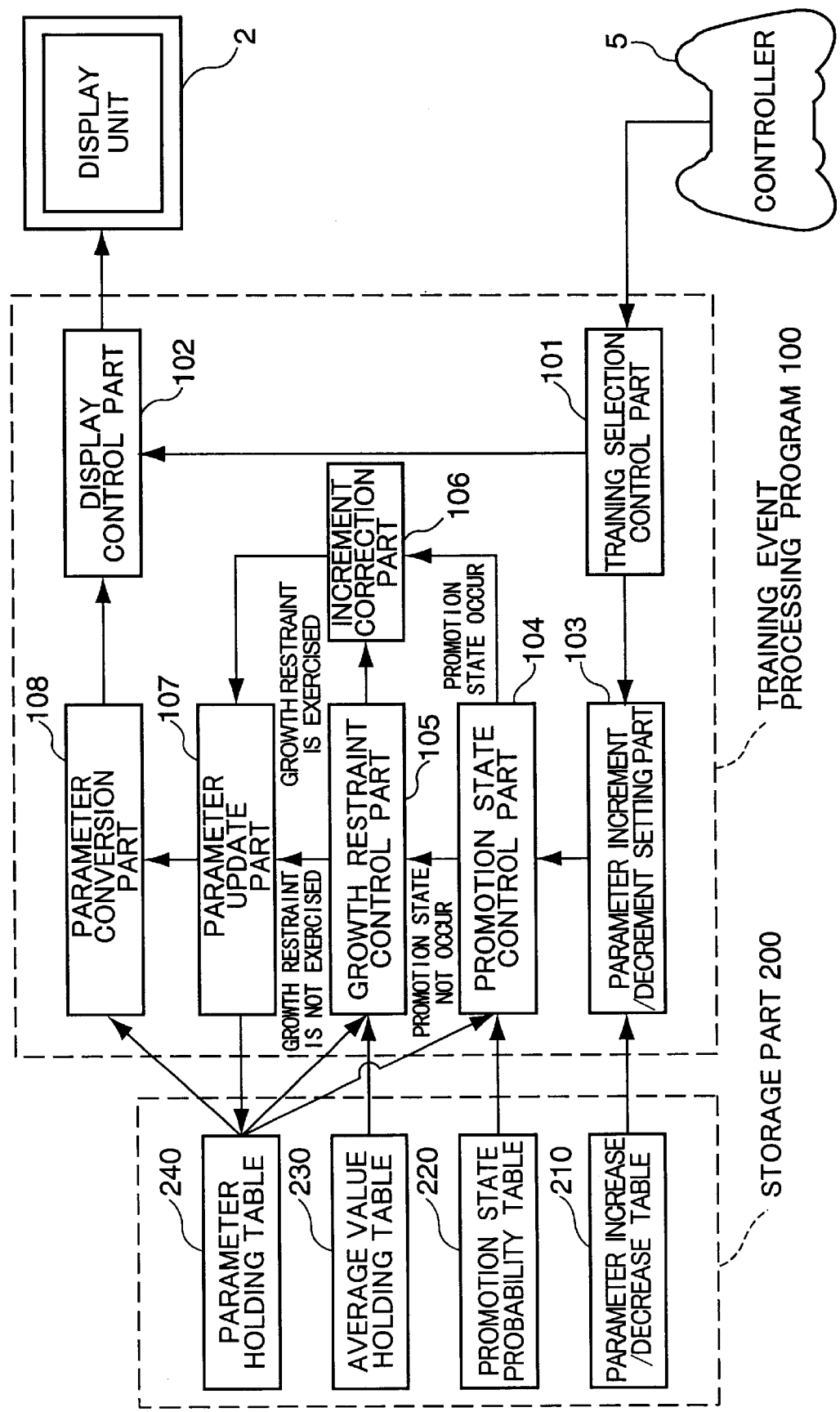
FIG. 7 is a block diagram for explaining the outline of the configuration of the training event processing program 100.

FIG. 7 is a block diagram that explains an outline of the configuration of a training event-processing program 100. (The present invention relates to increases in parameters and so description of decreases in parameters will be omitted.)

The training event processing program 100 comprises: a training selection control part 101 that receives training selections made by the user from the controller 5; a display control part 102 that controls display based on selected training and display of parameters converted into display values on the display unit 2; a parameter increment/decrement setting part 103 that sets increments and decrements for parameters based on the parameter increase/decrease table 210 stored in the storage part 200 (corresponding to RAM 12, DVD-ROM/CD-ROM or the like) (to be explained later using FIGS. 10 through 13); a promotion (bonus) state occurrence control part 104 that controls occurrence or non-occurrence of promotion (bonus) state based on a parameter holding table 240 (here it is assumed that parameters corresponding to table items in FIGS. 4A and 4B, parameters associated with the levels of confidence, good impression and the like of the club manager or team mates, and data showing the main character's country of citizenship, race, and position are managed as a table in the storage part 200) and a promotion (bonus) state probability table 220 (to be described later with FIG. 14); a restrained growth control part 105 that controls the exercise or non-exercise of growth restraint based on an average value holding table 230 (explained later using FIG. 16) and a parameter holding table 240; an increment correction part 106 that corrects the increment for each parameter in accordance with the occurrence of promotion (bonus) state or the exercise of growth restraint; a parameter update part 107 that updates the parameters in the parameter holding table 240 using the corrected or uncorrected increments; and a parameter conversion part 108 that converts the internal parameter values into display values.

The training event processing program 100 thus configured is executed in the procedures as shown below and the growth restraint and promotion (bonus) state are thereby caused to occur.

Figure 8:
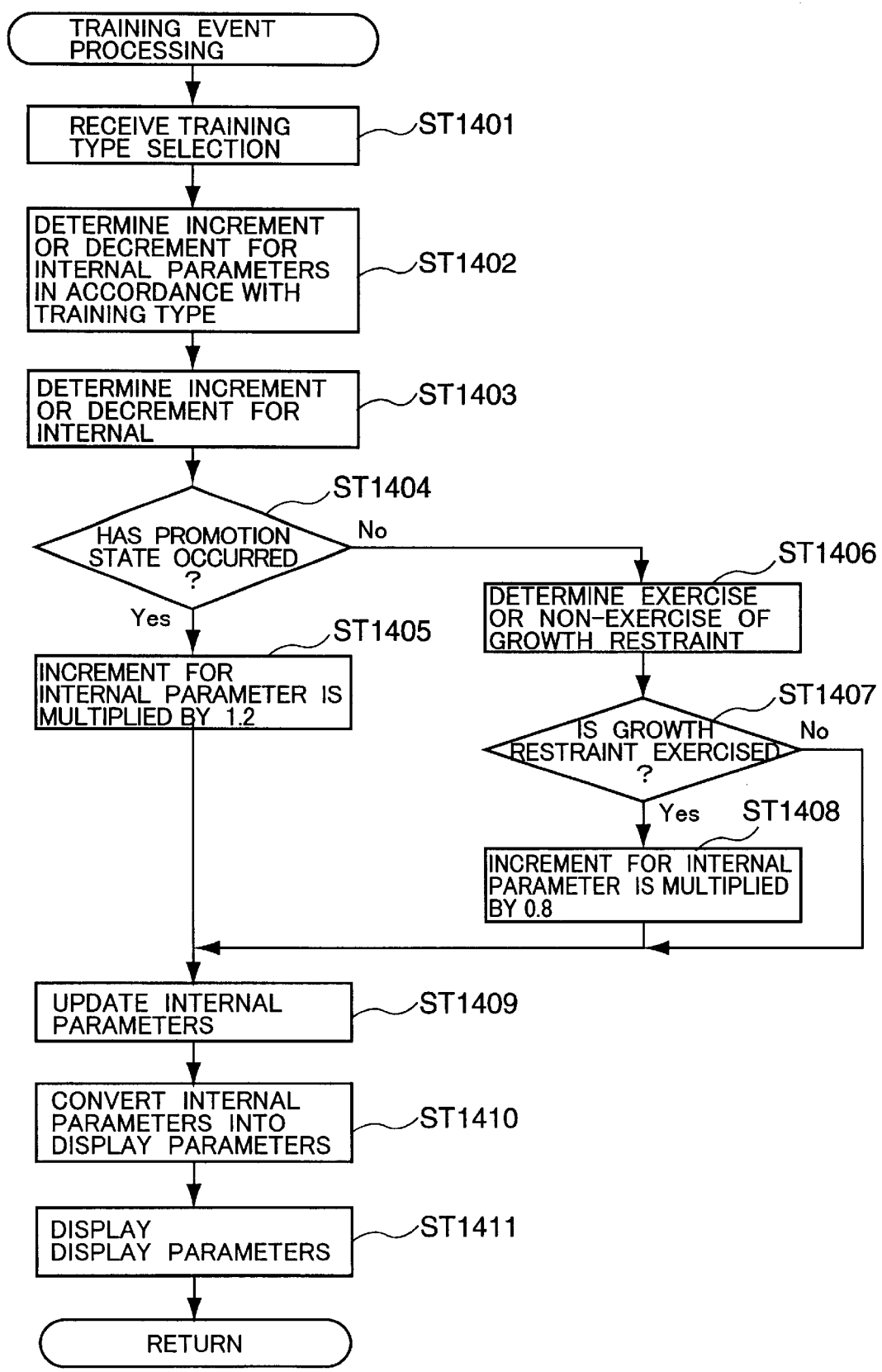
FIG. 8 is a flowchart showing the procedures involved in the training event processing.

FIG. 8 is a flowchart that shows the procedures involved in training event processing. FIGS. 10 through 13 show the parameter increase/decrease table used for setting the increments and decrements for internal parameters (internal parameter values) in ST1402 shown in FIG. 8. FIG. 14 shows the promotion (bonus) state probability table used for determining occurrence or non-occurrence of promotion (bonus) state in ST1403. FIG. 16 shows the average value holding table used for determining exercise or non-exercise of growth restraint in ST1406. FIG. 17 shows the parameter conversion table used in the conversion of internal parameter values into display values in ST1410.

Figure 9:
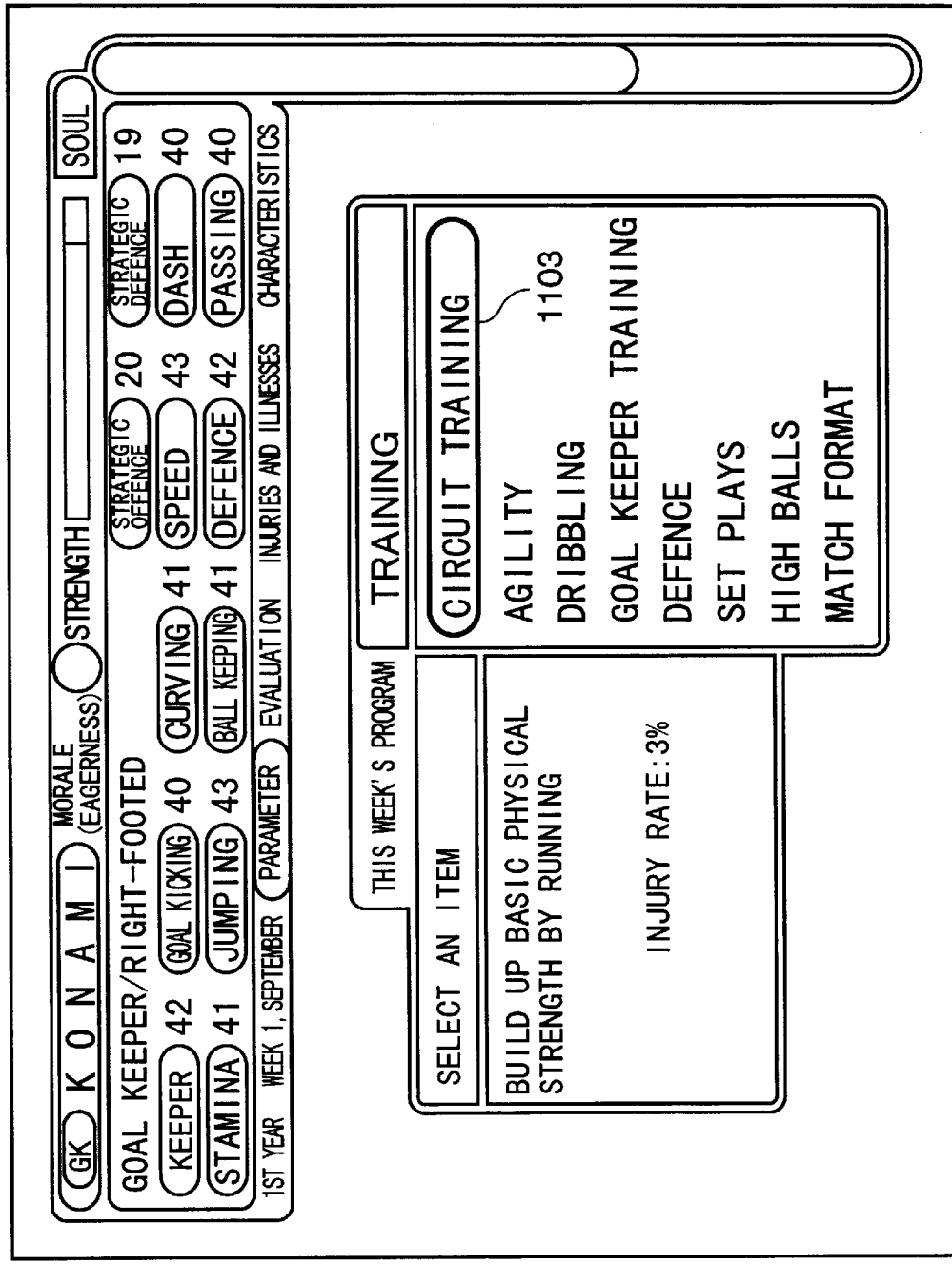
FIG. 9 is a diagram that shows the screen 203 displayed when training is selected in ST1401 in FIG. 8.
Figure 15:
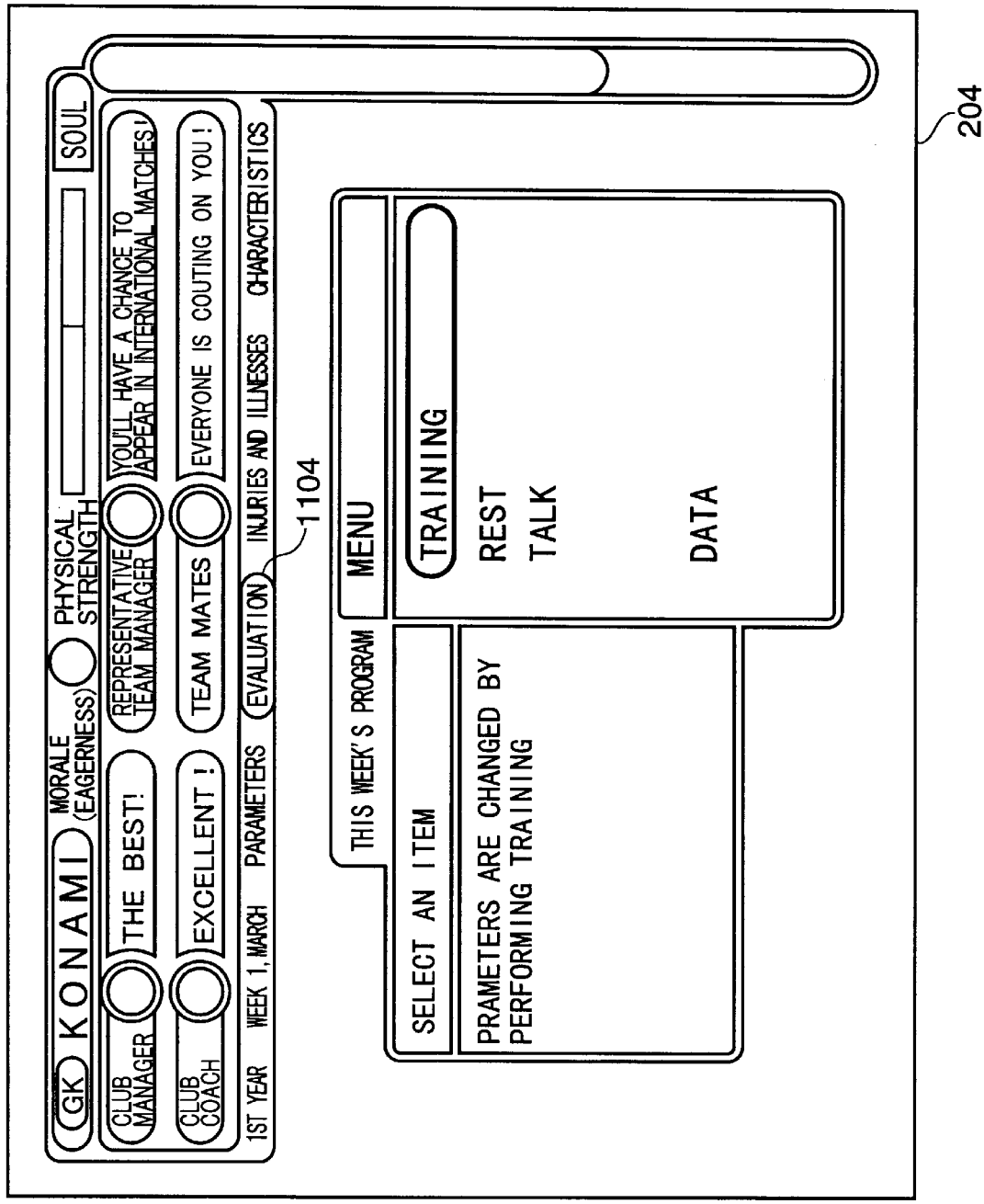
Figure 18:
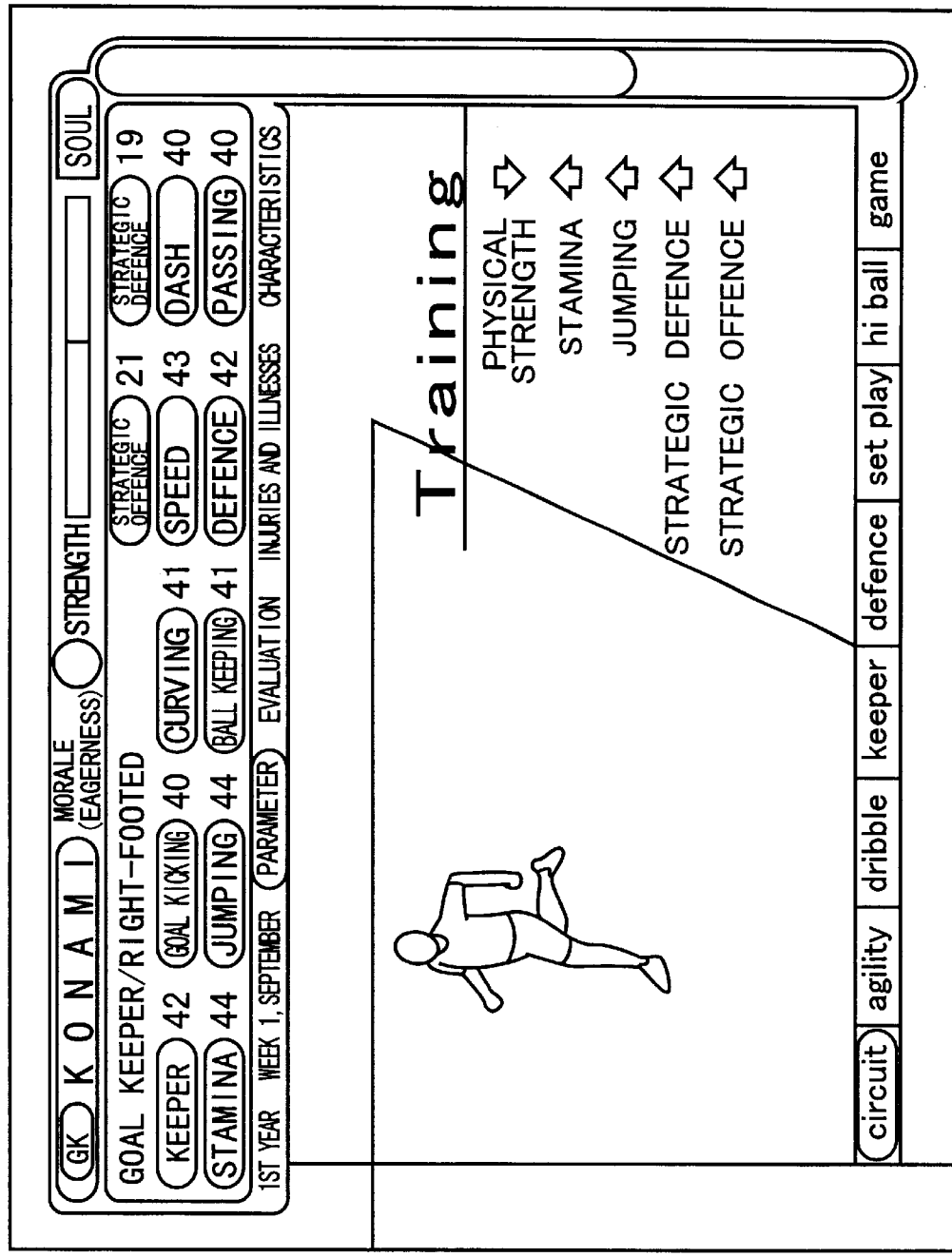
FIG. 18 shows the screen 205 (growth restraint is not exercised) that accompanies the display of the display parameters (display values of parameter) in ST1411 in FIG. 8.
Figure 19:
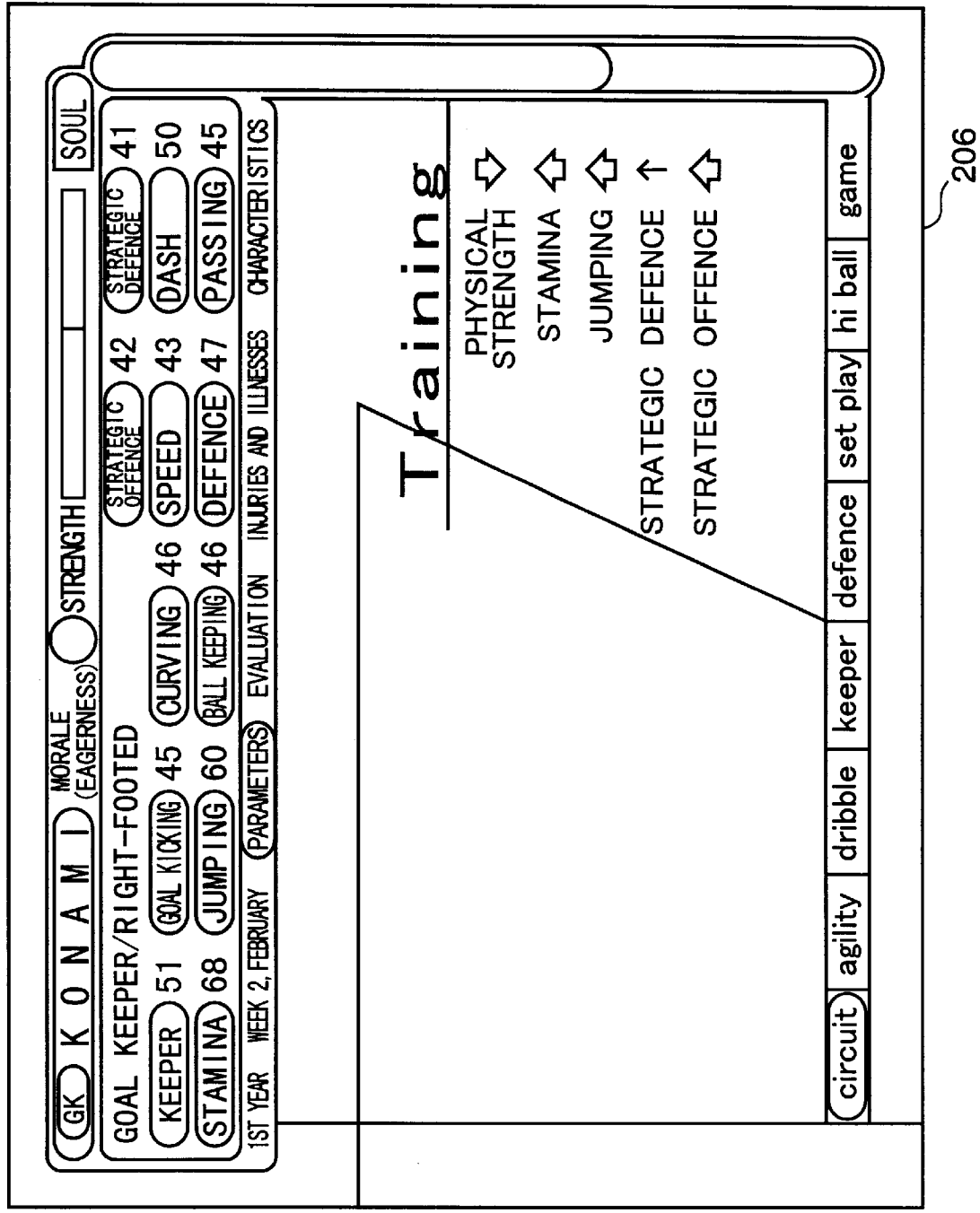
FIG. 19 shows the screen 206 (growth restraint is exercised) that accompanies the display of the display parameters.

Also, FIG. 9 shows the screen 203 displayed when a training type is selected in ST1401 shown in FIG. 8. FIG. 15 shows the screen 204 that includes the display that corresponds to the confidence levels of the club manager, representative team manager, team mates, and the like. FIG. 18 shows the screen 205 (growth restraint has not been exercised) that is displayed in association with the display of display parameters (parameter display values) in ST1411 shown in FIG. 8. FIG. 19 shows the screen 206 (growth restraint has been exercised) that is displayed in association with the display of display parameters.

In this training event processing, firstly selection of a training type is received by the training selection control part 101 (FIG. 7) (ST1401 in FIG. 8).

In practice, training types consisting of 'circuit training', 'agility', 'dribbling', 'goalkeeping training', 'defence', 'set plays', 'high balls', and 'match formats' are displayed on the screen 203 as shown in FIG. 9, and the user uses the controller 5 to move the cursor 1103 up or down and make a selection from the display.

For each of the selected training types, a value by which each parameter are increased or decreased is preset for each position in the parameter increase/decrease table 210. This parameter increase/decrease table 210 is referenced by the parameter increase/decrease setting part 103 to determine a value by which an internal parameter will be increased or decreased according to the selected training type (ST1402 in FIG. 8).

When the position of the main character is goalkeeper, a value by which each parameter is to be increased or decreased is determined based on the parameter increase/decrease table (GK) shown in FIG. 10. When the position of the main character is either center back, defender, wing back, or libero, a value by which each parameter is to be increased or decreased is determined based on the parameter increase/decrease table (DF) shown in FIG. 11. When the position of the main character is either offensive half, midfield, or wing back, a value by which each parameter is to be increased or decreased is determined based on the parameter increase/decrease table (MF) shown in FIG. 12, and when the position of the main character is either center forward, striker, or wing, a value by which each parameter is to be increased or decreased is determined based on the parameter increase/decrease table (FW) shown in FIG. 13.

For example, if the position of the main character has been set as center back and defence training has been selected in ST1401, the numbers in the fifth row, that is −20, −30, −30, +0, +0, +0, +10, +0, +0, +80, +0, +0, +0, +60, +1, +0, and +0, in the parameter increase/decrease table (DF) of FIG. 11 are increments and decrements for the parameters of physical strength, judgement, shooting, curving, speed, dash, stamina, jumping, ball keeping, defence, passing, goal keeping, strategic offence, strategic defence, confidence level of the manager, confidence level of the coach, and confidence level of team mates.

Next, in the promotion (bonus) state occurrence control part 104, the promotion (bonus) state occurrence probability is specified based on the level of confidence of team mates to the main character in the parameter holding table and the promotion (bonus) state probability table 220 (ST1403 in FIG. 8).

According to the promotion (bonus) state probability table in FIG. 14, the promotion (bonus) state occurrence probability is 5% when the team mate confidence level is 120. This team mate confidence level is kept secret from the user. When the user uses (a predetermined button on) the controller 5 as shown in FIG. 15 to move the cursor 1104 onto the display of 'Evaluation', only a character string, such as "We are counting on you!", which corresponds to the value of the team mate confidence level will be displayed.

(Here, the higher the value of team mate confidence level, the more likely a promotion (bonus) state will occur. This assumes that training is performed by all the team mates together. If the confidence level is high, the training can be performed efficiently, and if the confidence level is low, efficient training cannot be performed.)

In the promotion (bonus) state control table 104, random numbers are used to determine whether or not a promotion (bonus) state actually occurs with the specified promotion (bonus) state occurrence probability (ST1404 in FIG. 8). If a promotion (bonus) state occurs (Yes in ST1404), the increment for the internal parameter will be multiplied by 1.2 (a constant greater than 1) by the increment correction part 106 (ST1405) and processing will proceed to ST1409.

Also, if a promotion (bonus) state does not occur (No in ST1404), the growth restraint control part 105 indicates whether or not the growth restraint is exercised based on the average value holding table 230 and the value of internal parameters for the main character in the parameter holding table 240 (ST1406).

As shown in the average value holding table in FIG. 16, the countries that can be selected by the user as the country of citizenship of the main character are divided into four grades (so that a high average value is allocated to strong countries in accordance with the strengths of actual national soccer teams). When the value of each internal parameter for the main character is greater than the corresponding internal parameter in the average value holding table, growth restraint will be exercised. For example, if Belgium is set as the country of citizenship of the main character, and the internal value of the parameter showing speed is 2408, then growth restraint will be exercised for this parameter.

Furthermore, a plurality of parameters can be specified for each position and video and audio data to be used in the ending event in ST23 of FIG. 2 can be switched depending on whether all the values of the specified parameters are lower or higher than the average values. In other words, that fact that all the values of the specified parameters exceed these average values means that the main character is chosen as a member of the national team, and video and audio data corresponding thereto can be regenerated. The fact that the value of any of the parameters is lower than its average value means that the main character is not chosen as a member of the national team and video and audio data corresponding thereto can be regenerated.

Then, it is determined in the restrained growth control part 106 whether or not restrained growth occurs (ST1407 in FIG. 8). If growth restraint is not exercised (No in ST1407), processing proceeds directly to ST1409. If growth restraint has been exercised (Yes in ST1407), after the increment of the internal parameter is multiplied by 0.8 (a positive constant that is less than one) in the increment correction part 106 (ST1408), processing proceeds to ST1409.

In ST1409, the parameter update part 107 updates the internal parameters in the parameter holding table 240 based on the increment for the internal parameters corrected in ST1405 or ST1408, or based on the uncorrected increment for the internal parameters. The internal parameters are then converted into display parameters (ST1410) based on the parameter conversion table as shown in FIG. 17, these display parameters are displayed on the screen of the display unit 2 by the display control part 102 (ST1411), and the processing of this training event ends.

Both screen 205 of FIG. 18 and screen 206 of FIG. 19 show the display of display parameters by the display control part 102 following the execution of circuit training. Screen 205 is screen that results when there is no growth restraint exercised, while screen 206 results when there is growth restraint exercised. Here, the country of citizenship of the main character is Japan. In accordance with this selection of Japanese, it is assumed that the average value (display value) is set at 65 (refer to FIG. 16). While growth restraint is exercised in the parameter showing stamina, the exercise of growth restraint for this parameter is hidden and is not suggested to the user.

As above, in the video game system according to the first embodiment, the user selects a country of citizenship for the main character. When the main character is instructed to do training, if the value of each parameter is higher than the average value specified for that country of citizenship, growth restraint will be exercised and increase in the parameters that characterize the main character will be suppressed. Therefore, the main character can be made to suit the country of citizenship thereof, and the user can play a game which is more interesting and amusing.

Also, in this video game system, the suppression of increases in parameters caused by the above growth restraint (exercise of which is hidden from the user) can be mitigated by promotion (bonus) state. Therefore, even if a country with low preset average values is selected as the country of citizenship of the main character, by raising the confidence level of team mates, a player with high abilities can be nurtured and the user is allowed to play an interesting and amusing game.

A video game system according to a second embodiment of the present invention will be explained next. The overall configuration of the video game system of the second embodiment and procedures involved in success mode game processing and training event processing are similar, respectively, to the overall configuration of the video game system of the first embodiment as shown in FIG. 1 and the procedures involved in success mode game processing shown in FIG. 2 and training event processing as shown in FIG. 8. Therefore, detailed explanation of these shall be omitted. The internal values of parameters that characterize the main character used in the video game system of this second embodiment differ from the internal parameter values used in the video game system of the first embodiment. Therefore, they are the main subject of the following explanation.

Figure 20:
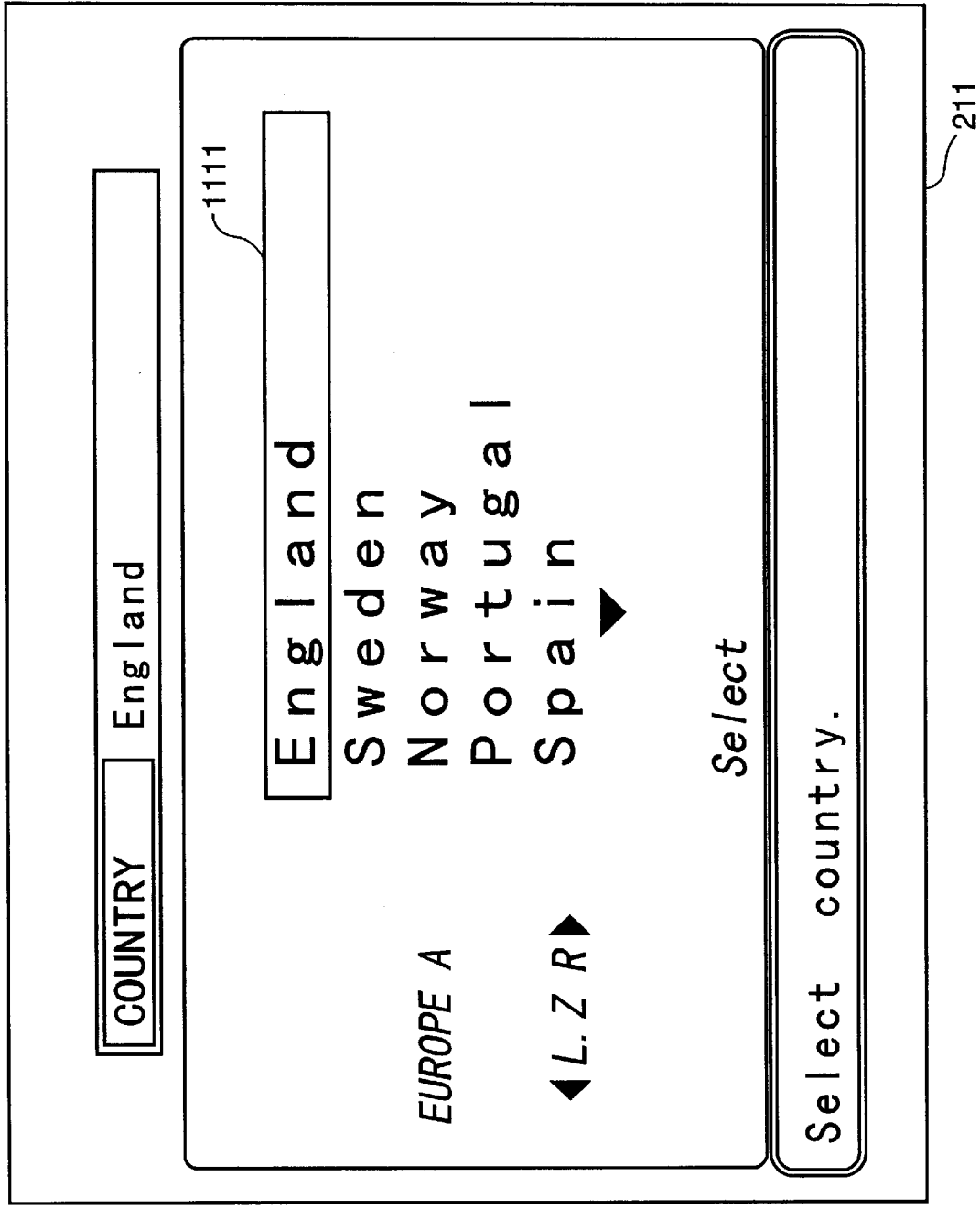
FIG. 20 shows the screen 211 displayed in association with character making (correspond to processing in ST5 of FIG. 2) in the video game system of a second embodiment.

FIGS. 20 and 21 for the video game system of the second embodiment correspond to FIG. 3 for the video game system of the first embodiment. FIGS. 22 and 23 correspond to FIGS. 4 and 5, FIG. 24 corresponds to FIG. 6, FIG. 25 to FIG. 9, FIG. 26 to FIGS. 10 through 13, FIG. 27 to FIG. 14, FIG. 28 to FIG. 15, FIG. 29 to FIG. 16, FIG. 30 to FIG. 17, and FIGS. 31 and 32 correspond to FIGS. 18 and 19. The video game system of the second embodiment will be explained, also using FIGS. 1, 2 and 8 for the video game system of the first embodiment.

FIGS. 20 and 21 show screens 211 and 212, which are displayed during character making (corresponding to the processing of ST5 in FIG. 2) in the video game system of the second embodiment. FIG. 22 shows the default values set by the character making for items that correspond to the abilities of the main character. FIG. 23 shows the values added to the parameters in accordance with a result of a selection match (corresponding to the processing of ST6 in FIG. 2).

Countries that can be selected by the user as the country of citizenship of the main character, such as 'England', 'Sweden', 'Norway', 'Portugal', and 'Spain' are displayed on screen 211 shown in FIG. 20. The user uses the controller (which is, as with controller 5, capable of moving the cursor to indicate selection or non-selection of items) to move the cursor 1111 up and down and select from the items displayed.

Here, in particular, using screen 212 as shown in FIG. 21, the user is prompted to confirm his/her input data in the process of character making. The user can either ascertain the input data of the main character (ends character making) or instruct change of the input data regarding the main character through an input from the controller. (Screen 212 shows that setting has been made so that the country the main character belongs is 'England', his name is 'Konami', his position is 'Goal keeper', his soccer club name is 'KCEO', his height is '175 cm', he is 'Right footed', and that his uniform, face (that specifies his skin color, white, brown, black or yellow), and club flag are set as shown in the diagrams.)

After such character making, as shown in FIG. 22A, default values are inserted as internal values in ordinary and important parameters (ordinary and important parameters are selected in accordance with the position played by the main character) among the parameters that characterize the main character, including physical condition (COND), morale and spirit, and other parameters including judgement, shooting, curving, speed, dash, stamina, jumping, ball keeping, and defence. Then, as shown in FIG. 22B, the parameter values are increased in accordance with the race of the main character.

A selection match is then played and the values shown in FIGS. 23A and 23B are added to parameters in accordance with the match results. (Here, refer to the explanation of the processing involved in ST18 through ST20 in FIG. 2 for 'Play a match' and 'View results'.)

Figure 24:
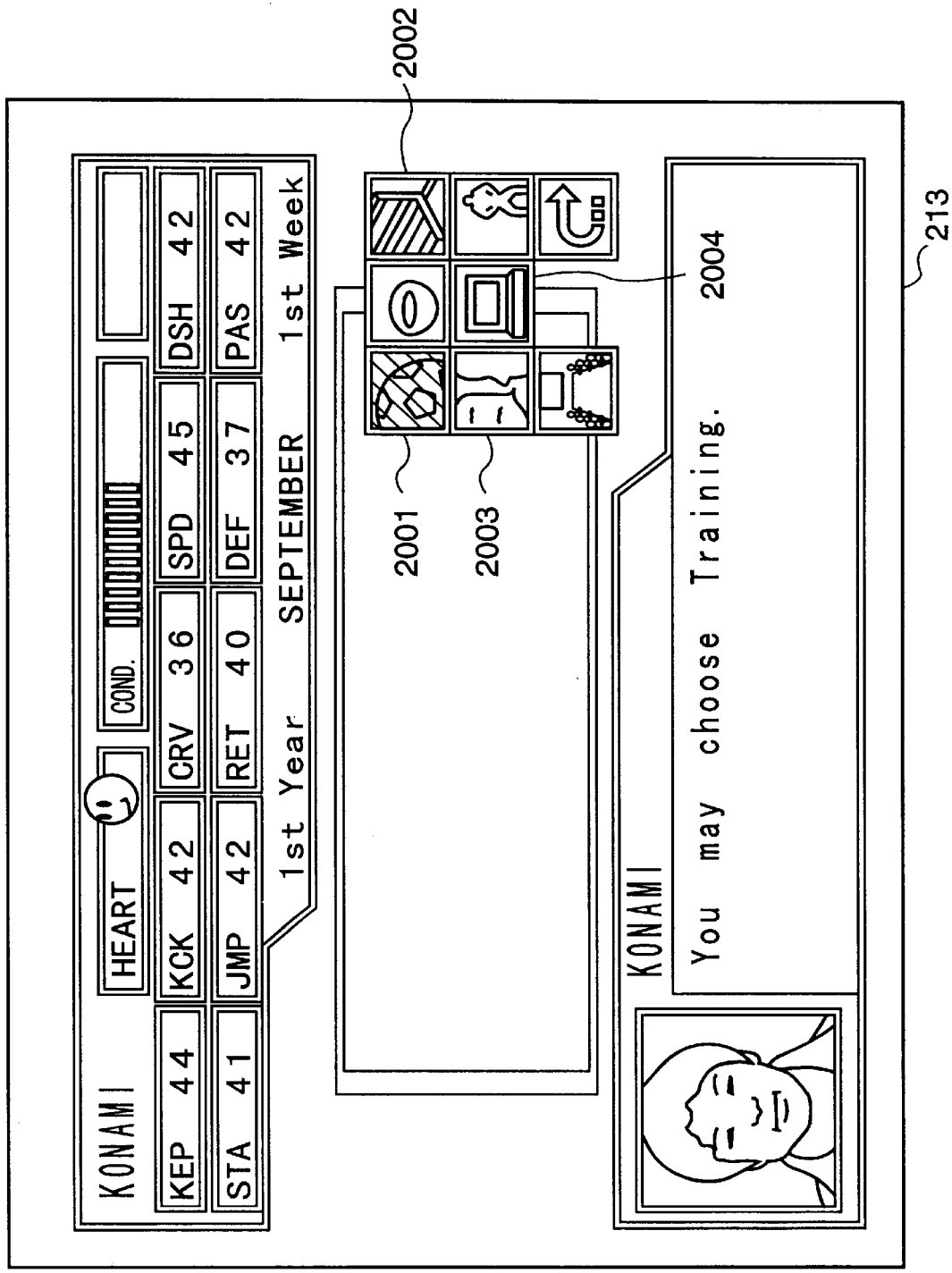
FIG. 24 shows the screen 213 displayed when selecting this week's activities (corresponding to processing in ST8 of FIG. 2)

FIG. 24 shows screen 213 which is displayed when 'This week's activities' is selected (corresponding to the processing in ST8 in FIG. 2). FIG. 25 shows screen 214 which is displayed when training is selected (corresponding to the processing in ST1401 in FIG. 8).

Screen 213, as shown in FIG. 24, is displayed after the values for all parameters for the main character have been set. Screen 213 contains display 2001 corresponding to training, display 2002 corresponding to rests, display 2003 corresponding to 'talk', and the display 2004 corresponding to data. Using the controller, the users moves the selection display (in the figure, shading indicates selected item) up or down, or left or right, to select either training, rest, 'talk', or data.

Screen 214 as shown in FIG. 25 is displayed when selection of training is determined in screen 213. Screen 214 contains display 2011 corresponding to running, display 2012 corresponding to dash, display 2013 corresponding to dribbling, display 2014 corresponding to heading (high balls), display 2015 corresponding to goal keeping training, display 2016 corresponding to place and kick, display 2017 corresponding to goal shooting, and display 2018 corresponding to defence. In the same manner as above, by moving the selection display up or down or to the left or right using the controller, the user selects a training type from among running, dash, dribbling, heading, goal keeping training, placement kicks, goal shooting, and defence. (Using a predetermined operation, the user can also select a training type in a match format according to the position played by the main character.)

Figure 28:
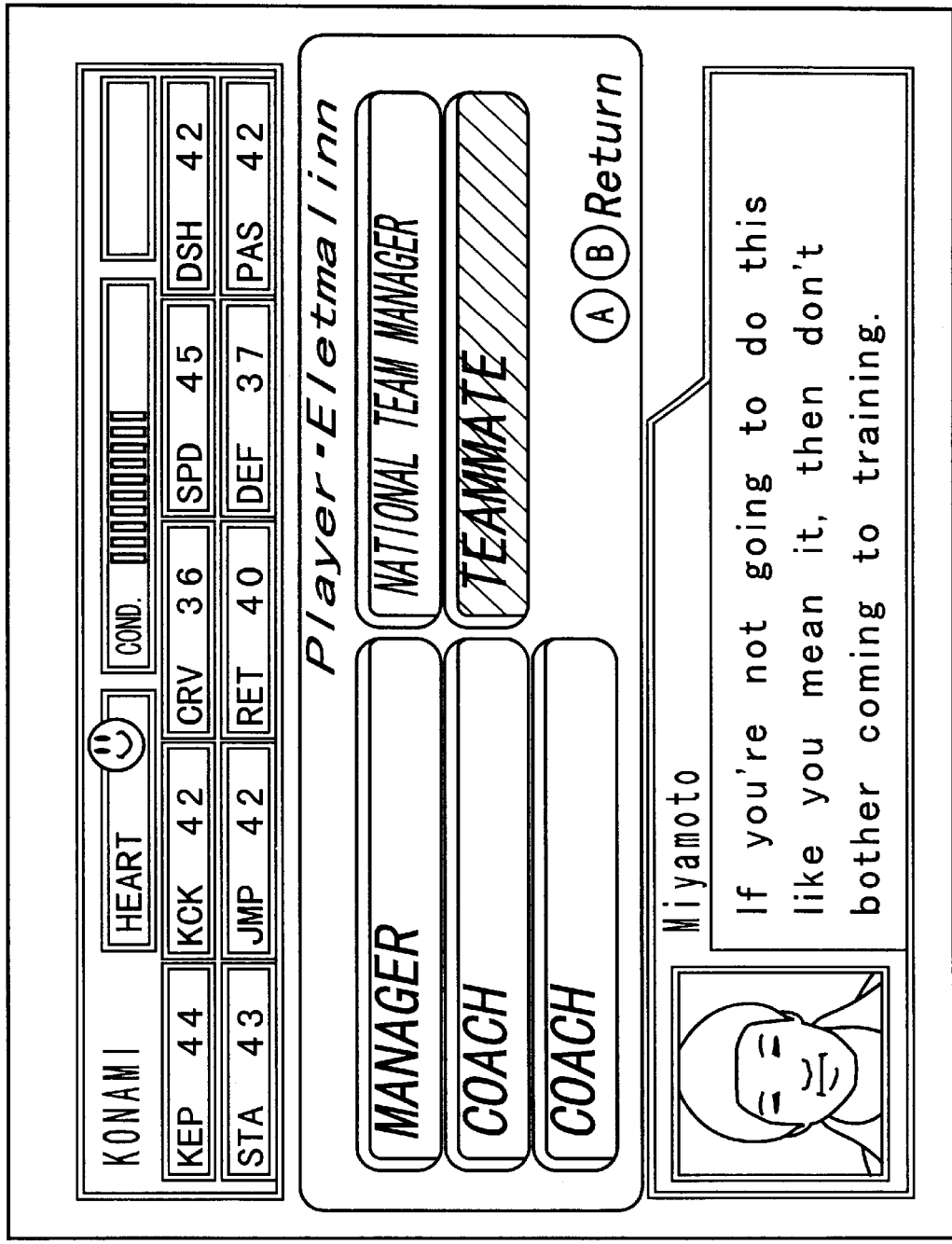
FIG. 28 shows the screen 215 that includes the display of confidence level of the team mate.

FIG. 26 shows the parameter increase/decrease table used for setting increments and decrements for the internal parameters (corresponding to the processing involved in ST1402 in FIG. 8). FIG. 27 shows the promotion (bonus) state probability table used when indicating occurrence or non-occurrence of promotion (bonus) state (corresponding to the processing involved in ST1403) and FIG. 28 shows screen 215 that includes a display corresponding to the confidence level of the team mate.

When the user has selected a training type as described above, increments and decrements are set based on the parameter increase/decrease table shown in FIG. 26 in accordance with the type of training selected and the position played by the main character. A probability based on the promotion (bonus) state probability table shown in FIG. 27 is then set according to the confidence level of the team mate which is one of the parameters, and occurrence or non-occurrence is specified based on this probability. This confidence level of the team mate is not displayed as a numerical value. Rather, when a predetermined input is made using the controller, as on the screen 215 shown in FIG. 28, only a character string that corresponds to the confidence level of the team mate, such as "If you're not going to do this like you mean it, then don't bother coming to training," will be displayed.

When a promotion (bonus) state occurs, the increments for internal parameters will be multiplied by 1.2 (corresponding to the processing in ST1405) and increase of parameters will be prompted. When a promotion (bonus) state does not occur, whether or not growth restraint is exercise will be further specified (corresponding to the processing in ST1406).

FIG. 29 shows the average value holding table used in the specification of exercise or non-exercise of growth restraint (corresponding to the processing in ST1406). FIG. 30 shows the parameter conversion table used for converting internal parameter values (internal parameters) into display values (display parameters) (corresponding to the processing in ST1410).

The 24 countries from which the user can select as the country of citizenship of the main character are divided into four grades, and growth restraint is exercised if the values of the internal parameters for the main character are the same as or exceed the values of the corresponding internal parameters in the average value holding table shown in FIG. 29.

The increments for the internal parameters, determined in accordance with training types, may be corrected as the result of exercise of growth restraint (corresponding to the processing in ST1408) or the occurrence of promotion (bonus) state (corresponding to the processing in ST1405). The internal parameters are then updated in accordance with the corrected or uncorrected increments for the internal parameters (corresponding to the processing in ST1409). The updated internal parameters are converted into display parameters according to the parameter conversion table shown in FIG. 30 (corresponding to the processing in ST1410), and the values of the display parameters are displayed (corresponding to the processing in ST1411).

Figure 31:
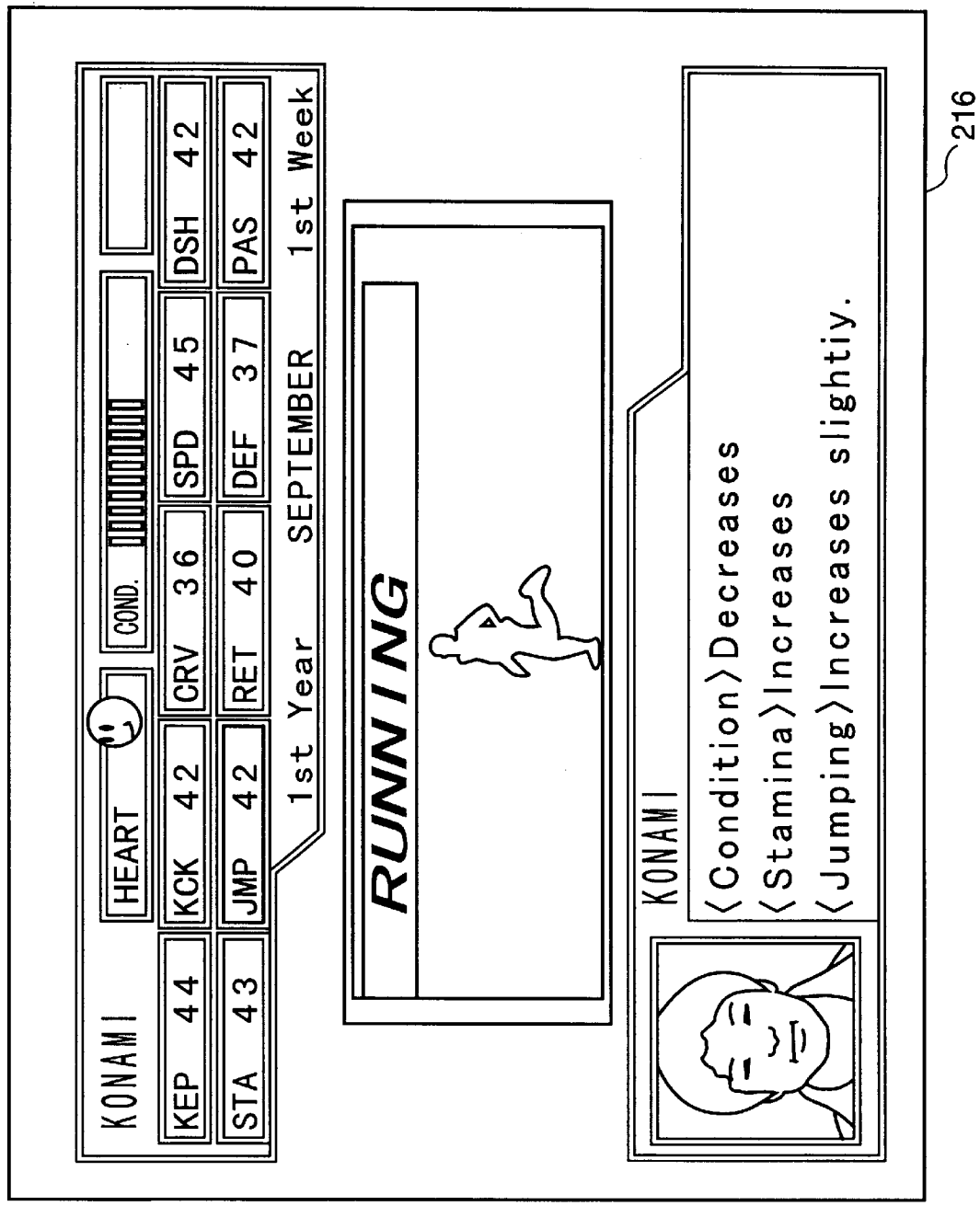
FIG. 31 shows the screen 216 (growth restraint has not been exercised) that accompanies the display of the display parameters (corresponding to processing in ST1411)
Figure 32:
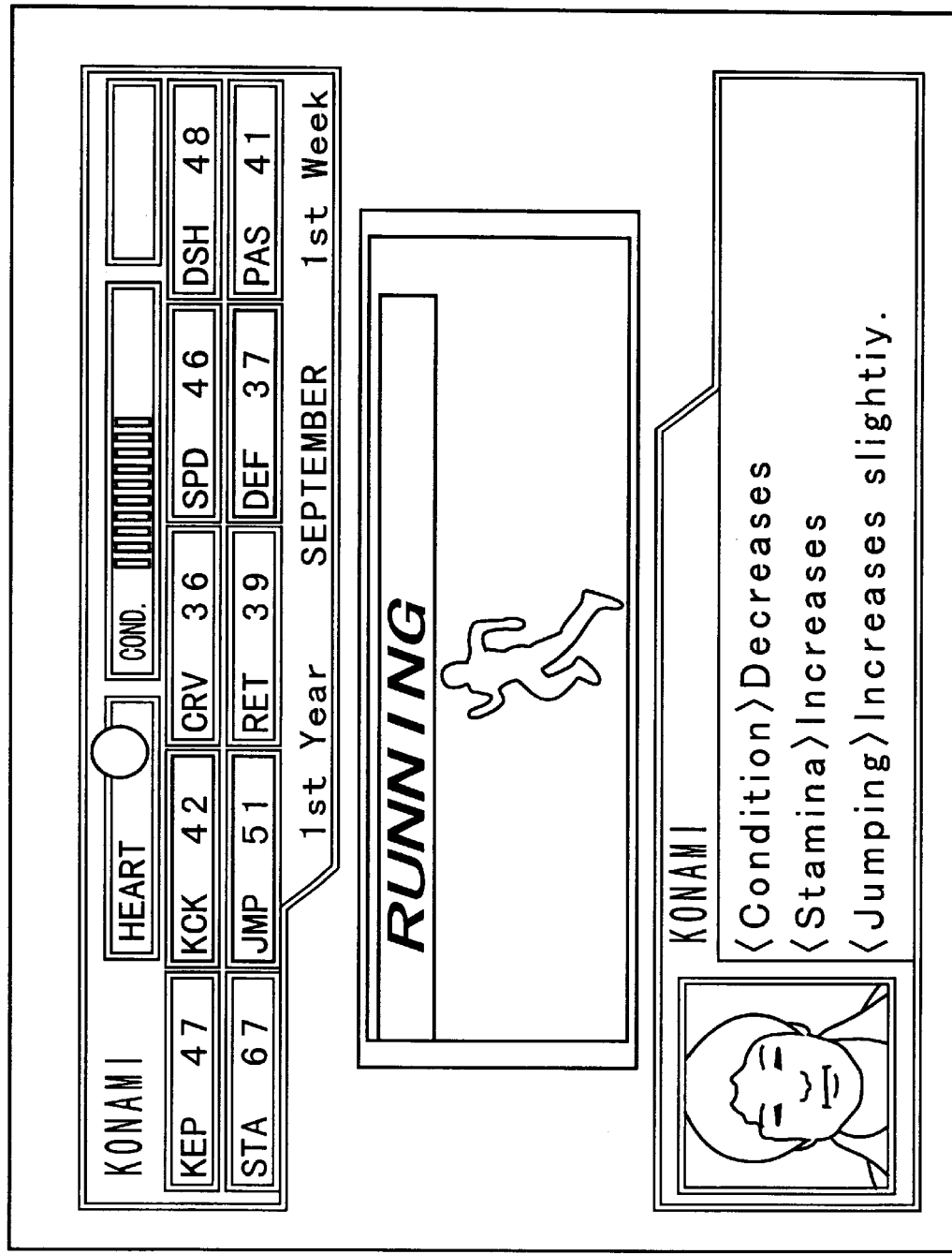
FIG. 32 shows the screen 217 (growth restraint has been exercised) that accompanies the display of the display parameters.

FIG. 31 shows screen 216 (growth restraint has not been exercised) that accompanies the display of display parameters (corresponding to the processing in ST1411), and FIG. 32 shows screen 217 (growth restraint has been exercised) that accompanies the display of display parameters.

Screen 216 in FIG. 31 and screen 217 in FIG. 32 show the display of display parameters after running has been done. Screen 216 shows the display parameters when growth restraint has not been exercised and screen 217 in FIG. 32 shows the display parameters when growth restraint has been exercised. Here, it is assumed that the country of citizenship of the main character is Japan (average value of 65). While growth restraint is exercised for the parameter showing stamina, the exercise of growth restraint for such parameters is hidden from the user and not suggested to the user.

As above, in the video game system of the second embodiment (as with the video game system of the first embodiment described above), the user selects a country of citizenship of the main character. When the main character is directed to do training, if the value for each parameter exceeds the average value specified for that country of citizenship, growth restraint will be exercised and increase in the parameters that characterize the main character will be suppressed. Therefore, the user can create a main character that suits the country of citizenship chosen. This makes the game more interesting and amusing.

Also, in this video game system, the suppression of increases in parameters that is caused by the growth restraint (the exercise of which is hidden from the user) is mitigated by the promotion (bonus) state. Therefore, even if a country for which a low average value is set for the growth restraint is selected as the country to which the main character belongs, by raising the confidence level of the team mate, the user can nurture a player of high abilities and thus the game can be made more interesting and more amusing.

With the present invention, (main) game characters can be made to suit the country of citizenship selected, which allows the user to play a more interesting and amusing game.

The present invention enables the above effects to be achieved using a simple technique.

With the present invention, the country of citizenship of the game character is set based on the user's preferences, which makes the game more interesting and amusing.

With the present invention, suppression of increases in parameters is mitigated using probability according to the value of one predetermined parameter, which allows the user to play a more interesting and amusing game.

The present invention enables the above effects to be achieved using a simple technique.

With the present invention, the probability of accelerating the increase in the value of a parameter will increase as the value of one predetermined parameter increases, which makes the game more interesting and amusing.

This application is based on Japanese patent application serial no. 2000-142226 filed on May 15, 2000, the contents of which are hereby incorporated by reference.

Although the present invention has been fully described by way of examples with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A training game device that receives specification of one of a plurality of predetermined training types through a predetermined input part for a game character displayed on a monitor, and that enables the character to be trained by increasing and decreasing values of a plurality of parameters that characterize the game character in correspondence with the received specified training type, said training game device comprising:

setting means for setting one of a plurality of predetermined countries as the country of citizenship of the game character;

judgement means for judging whether or not a parameter value of the game character exceeds a reference value predetermined for the set country when the parameter value is increased or decreased; and suppression means for suppressing increase in a parameter value when the parameter value of the game character is judged to be greater than said reference value.

2. The training game device according to claim 1, wherein increase or decrease in said parameter values is performed in accordance with a table that shows an increment or decrement in a parameter value in correspondence with each of a plurality of training types, and wherein said suppression means suppresses increase in the parameter value by adding to the parameter value a value obtained by multiplying the increment according to the table by a constant value a (0<a<1).

3. The training game device according to claim 1, wherein said setting means sets one of the plurality of countries based on a selection that is input by a user from an input part.

4. The training game device according to claim 1, further comprising:

second setting means for setting a probability according to a value of one predetermined parameter that characterizes the game character; and promotion means for promoting increase in the parameter value in accordance with the set probability, wherein said suppression means implements said suppression only when said promotion means does not promote the increase in the parameter value.

5. The training game device according to claim 4, wherein said parameter values are increased or decreased in accordance with the table that shows an increment or decrement for each of the parameter values in correspondence with each of the plurality of training types, and wherein said promotion means promotes increase in the parameter value by adding to the parameter value a value obtained by multiplying the increment according to the table by a constant value b (b>1).

6. The training game device according to claim 4, wherein said second setting means sets a probability based on a table that shows the probability values to be increased in stepwise manner along with increase in the value of one predetermined parameter.

7. The training game device according to claim 6, wherein said predetermined parameter includes a team mate confidence level to the game character.

8. A control method for a training game device that receives specification of one of a plurality of predetermined training types through a predetermined input part for a game character displayed on a monitor, and that enables the character to be trained by increasing and decreasing values of a plurality of parameters that characterize the game character in correspondence with the received specified training type, said control method comprising the steps of:

setting one of a plurality of predetermined countries as the country of citizenship of the game character, judging whether or not a parameter value of the game character exceeds a reference value predetermined for the set country when the parameter is increased or decreased, and suppressing increase in the parameter value when the parameter value of the game character is judged to be greater than said reference value.

9. The control method according to claim 8, further comprising the steps of:

setting a probability according to the value of one predetermined parameter that characterizes the game character, promoting increase in the parameter value in accordance with the set probability; and said suppressing step suppresses increase in the parameter value only when said promoting step is not implemented.

10. A readable storage medium for storing a training game program that receives specification of one of a plurality of predetermined training types through a predetermined input part for a game character displayed on a monitor, and that enables the character to be trained by increasing and decreasing values of a plurality of parameters that characterize the game character in correspondence with the received specified training type, said game program comprising:

setting one of a plurality of predetermined countries as the country of citizenship of the game character, judging whether or not a parameter value of the game character exceeds a reference value predetermined for the set country when the parameter is increased or decreased, and suppressing increase in the parameter value when the parameter value of the game character is judged to be greater than said reference value.

11. The readable storage medium according to claim 10, further comprising the steps of:

setting a probability according to the value of one predetermined parameter that characterizes the game character, promoting increase in the parameter value in accordance with the set probability; and said suppressing step suppresses increase in the parameter value only when said promoting step is not implemented.

12. A training game device that receives specification of one of a plurality of predetermined training types through a predetermined input part for a game character displayed on a monitor, and that enables the character to be trained by increasing and decreasing values of a plurality of parameters that characterize the game character in correspondence with the received specified training type, said training game device comprising:

setting means for setting one of a plurality of predetermined countries as the country of citizenship of the game character;

judgement means for judging whether or not a parameter value exceeds a reference value predetermined for the set country when the parameter value is increased or decreased;

suppression means for suppressing increase in a parameter value when the parameter value is judged to be greater than said reference value;

second setting means for setting a probability according to a value of one predetermined parameter that characterizes the game character; and promotion means for promoting increase in the parameter value in accordance with the set probability, wherein said suppression means implements said suppression only when said promotion means does not promote the increase in the parameter value.

13. The training game device according to claim 12, wherein said parameter values are increased or decreased in accordance with the table that shows an increment or decrement for each of the parameter values in correspondence with each of the plurality of training types, and wherein said promotion means promotes increase in the parameter value by adding to the parameter value a value obtained by multiplying the increment according to the table by a constant value b (b>1).

14. The training game device according to claim 12, wherein said second setting means sets a probability based on a table that shows the probability values to be increased in stepwise manner along with increase in the value of one predetermined parameter.

15. The training game device according to claim 14, wherein said predetermined parameter includes a team mate confidence level to the game character.

* * * * *